(12) United States Patent
Siann et al.

(10) Patent No.: US 11,304,137 B2
(45) Date of Patent: *Apr. 12, 2022

(54) METHOD FOR WAKING FROM ENERGY-EFFICIENT HIBERNATION

(71) Applicant: TRAKPOINT SOLUTIONS, INC., San Diego, CA (US)

(72) Inventors: Jon Siann, San Diego, CA (US); Christopher Williams, San Diego, CA (US)

(73) Assignee: TRAKPOINT SOLUTIONS, INC., San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/348,186

(22) Filed: Jun. 15, 2021

(65) Prior Publication Data
US 2021/0314863 A1 Oct. 7, 2021

Related U.S. Application Data

(63) Continuation-in-part of application No. 17/065,197, filed on Oct. 7, 2020, now Pat. No. 11,063,651, which is a continuation-in-part of application No. 16/778,577, filed on Jan. 31, 2020, now Pat. No. 10,841,894.

(51) Int. Cl.
| | |
|---|---|
| *G06F 9/00* | (2006.01) |
| *H04W 52/02* | (2009.01) |
| *G01S 3/14* | (2006.01) |
| *H04W 12/06* | (2021.01) |
| *G06F 9/4401* | (2018.01) |

(52) U.S. Cl.
CPC .......... *H04W 52/0216* (2013.01); *G01S 3/14* (2013.01); *H04W 12/06* (2013.01); *H04W 52/0229* (2013.01); *G06F 9/4401* (2013.01)

(58) Field of Classification Search
CPC . H04W 64/003; H04W 4/70; H04W 52/0219; H04W 12/06; H04W 4/80; H03H 21/003; G06F 9/4418
USPC .......................................................... 713/2
See application file for complete search history.

(56) References Cited

U.S. PATENT DOCUMENTS

| | | | | |
|---|---|---|---|---|
| 6,593,845 | B1 * | 7/2003 | Friedman | G06K 19/0701 340/10.1 |
| 9,405,941 | B2 * | 8/2016 | Smith | G06K 7/10009 |
| 10,613,801 | B1 * | 4/2020 | Matysiak | H04N 1/00244 |

(Continued)

*Primary Examiner* — Volvick Derose
(74) *Attorney, Agent, or Firm* — Nguyen Tarbet LLC

(57) ABSTRACT

The present invention is directed to energy-efficient hibernation in indoor wireless localization systems. A tag passively associates with a detection point (DP) and establishes a reveille time. The tag will awaken at the reveille time and send or receive a beacon to or from its associated DP. If the tag is receiving a beacon, it will awaken, receive, phase-lock its clock based on when the beacon was expected and when it was actually received, and return to hibernation. The DP transmits a scattershot of beacons, one for every tag in the system. If the tag is sending a beacon, it will awaken, send its beacon, and return to hibernation. The DP will receive the beacon and adjust its own clock based on the delay between when the beacon was expected and when it was actually received. The tag will broadcast its location to the DP on a set interval.

19 Claims, 17 Drawing Sheets

(56) References Cited

U.S. PATENT DOCUMENTS

| | | | |
|---|---|---|---|
| 2002/0006805 A1* | 1/2002 | New | H04W 48/16 455/525 |
| 2004/0140884 A1* | 7/2004 | Gallagher, III | G06K 7/10039 340/10.2 |
| 2005/0206555 A1* | 9/2005 | Bridgelall | G01S 13/878 342/127 |
| 2006/0187045 A1* | 8/2006 | Heinze | G08B 21/023 340/572.1 |
| 2007/0205896 A1* | 9/2007 | Beber | G06K 17/00 340/572.1 |
| 2008/0068131 A1* | 3/2008 | Cargonja | G06K 7/0008 340/10.1 |
| 2009/0085738 A1* | 4/2009 | Darianian | G06K 7/10356 340/539.11 |
| 2009/0096586 A1* | 4/2009 | Tubb | G01S 19/34 340/10.33 |
| 2009/0267770 A1* | 10/2009 | Twitchell, Jr. | G06Q 10/087 340/572.1 |
| 2010/0019887 A1* | 1/2010 | Bridgelall | H04Q 9/00 340/10.2 |
| 2010/0060432 A1* | 3/2010 | van Niekerk | G06K 7/0008 340/10.3 |
| 2010/0325550 A1* | 12/2010 | Wong | G06Q 10/087 715/735 |
| 2011/0074552 A1* | 3/2011 | Norair | G06K 7/0008 340/10.1 |
| 2011/0291803 A1* | 12/2011 | Bajic | G08B 13/2462 340/10.1 |
| 2012/0161943 A1* | 6/2012 | Byun | G06Q 30/06 340/10.6 |
| 2013/0033364 A1* | 2/2013 | Raz | G06K 19/07767 340/10.1 |
| 2013/0187761 A1* | 7/2013 | Shoarinejad | G06K 19/0723 340/10.1 |
| 2013/0285794 A1* | 10/2013 | Hansen | H04L 12/1813 340/8.1 |
| 2014/0003406 A1* | 1/2014 | Kamath | H04W 76/25 370/338 |
| 2014/0023195 A1* | 1/2014 | Lee | H04L 63/0492 380/270 |
| 2014/0086275 A1* | 3/2014 | Kim | H03M 1/06 374/170 |
| 2014/0269643 A1* | 9/2014 | Sun | H04W 52/0229 370/338 |
| 2014/0282974 A1* | 9/2014 | Maher | H04L 9/3271 726/7 |
| 2014/0337434 A1* | 11/2014 | Hansen | H04L 12/1813 709/204 |
| 2014/0341379 A1* | 11/2014 | Fairbanks | H04L 63/083 380/270 |
| 2014/0372775 A1* | 12/2014 | Li | H04L 49/405 713/300 |
| 2015/0015371 A1* | 1/2015 | Hansen | A63B 71/0616 340/10.1 |
| 2016/0294796 A1* | 10/2016 | Hidayat | H04L 63/08 |
| 2017/0232325 A1* | 8/2017 | Hansen | G06K 7/10475 340/10.1 |
| 2018/0164398 A1* | 6/2018 | Olsen | G01S 5/30 |
| 2018/0196972 A1* | 7/2018 | Lu | H04W 52/0274 |
| 2019/0102587 A1* | 4/2019 | Calvarese | G06K 7/10019 |

\* cited by examiner

Wake Up & Respond Mechanism

Authentication Event

Passive Authentication Event

Regular Update Event

METHOD FOR WAKING FROM ENERGY-EFFICIENT HIBERNATION

CROSS-REFERENCES TO RELATED APPLICATIONS

This application is a continuation-in-part and claims benefit of U.S. patent application Ser. No. 17/065,197, filed Oct. 7, 2020 which is a continuation-in-part and claims benefit of U.S. patent application Ser. No. 16/778,577, filed Jan. 31, 2020 (now U.S. Pat. No. 10,841,894), the specification of which is incorporated herein in its entirety by reference.

BACKGROUND OF THE INVENTION

For indoor localization systems comprising a plurality of radiofrequency (RF) tags and a plurality of detection points (DP), a balanced trade-off between energy-efficiency and accuracy is a primary design objective. Past indoor localization systems strove to maximize accuracy by keeping RF tags in an active state for the sake of updating the tags and DPs on each other's locations often. This limits energy efficiency due to the frequent transmissions taking place between members of the system. Research found that RF tags can switch between an active and inactive state and only communicate with DPs while active in order to save power while updating the location of each RF tag and DP enough to maintain a high level of accuracy.

Prior art indoor localization systems that are designed with RFID technology employ multiple states in RF tags by keeping them in a state of hibernation while remaining open to signal reception until the DP sends a wakeup signal to every associated tag in order to update the location. At this point, the tags are switched to an active state in order to create a network. While these systems improve energy efficiency when compared to prior systems and maintain a high level of accuracy, they are limited by the fact that the tags must always be prepared to receive a wakeup signal and that every RF tag must be kept active after receiving a wakeup signal. Thus, an indoor localization system that keeps RF tags in an even less active state, only switches the tags to a receptive state at the exact time a DP sends a wakeup signal, and returns the tags to an inactive state immediately afterwards all while maintaining accuracy would improve energy efficiency even further.

FIELD OF THE INVENTION

The present invention generally relates to the field of radiofrequency indoor localization.

BRIEF SUMMARY OF THE INVENTION

The present invention is directed to radio-frequency (RF) tags waking from energy-efficient hibernation to receive and send transmissions to detection points (DPs) for the sake of energy efficiency. A RF tag may detect that it has moved and passively associate with a DP. Associating with the DP may generate a reveille time in the tag based on the ID of both the tag and the DP. The reveille time may determine when the tag will awaken to receive transmission from the DP or send messages to the DP and may be kept track of by an imprecise clock.

From this point, the present invention has different methods depending on whether a tag will be receiving or sending transmissions. In the case of a tag receiving transmissions, on a constant interval of about 30 seconds, kept track of by a precise clock, a DP may transmit a beacon comprising an address for every possible address so that it may send its data to any tag that may be passively associated with the DP. At the reveille time, the tag may awaken and receive the beacon from the DP it has associated with and read the address to confirm that it is receiving from the correct DP. Upon accepting the beacons, the tag may execute a phase lock on its imprecise clock based on the time between when the beacon was received and when it was expected to be received in order to correct the imprecise clock and sync with the precise clock of the DP. The tag may then return to a hibernation state until the next reveille time causes it to wake again. The tag saves power by remaining active only when necessary and hibernating at all other points.

In the case of a tag sending transmissions, the tag may awaken at the reveille time using a sloppy clock. The tag may transmit a beacon comprising an address to an associated DP, which the DP may then receive. The DP may confirm the address of the beacon and delay its timing for future transmissions to the tag. The delay may be calculated by a precise clock and is equal to a difference between when the beacon was received to when the beacon was expected to be received. The tag may then return to a hibernation state until the next reveille time causes it to wake again. The tag saves power by remaining active only when necessary and hibernating at all other points.

After both of these cases, a tag may update its location to a DP that it has associated with by transmitting a plurality of transmissions. This may be done on an interval of about 15 minutes, meaning that a DP in a plurality of DPs may only know the exact location of the associated tag every 15 minutes.

The present invention is additionally directed to two-way authentication between an RF tag and a DP for the sake of security. The DP may generate two copies of a prime integer to act as a first challenge and a second challenge. The first challenge may be transmitted to the RF tag, comprising a root of trust with an encryption key. The tag may encrypt the first challenge using its encryption key, and transmit the encrypted challenge back to the DP. Upon receiving the encrypted challenge, the DP sends the encrypted challenge to a cloud application which searches through its contained database of every encryption key mapped to every tag. When the encryption key corresponding to the tag is found in the database the cloud application may use the encryption key on the second challenge and compare the tag's encrypted first challenge to the DP's encrypted second challenge, and if the challenges are equal then the authentication procedure has passed.

One of the many inventive technical features of the present invention is the scattershot of beacons transmitted by a DP, along with the awakening of a RF tag to receive the correct beacons at the correct time. Without wishing to limit the invention to any theory or mechanism, it is believed that the technical feature of the present invention advantageously provides for a decrease in overall energy consumption due to the fact that the RF tag is synced to awaken and use power only when the DP is transmitting to it, and is synced to hibernate in between intervals. None of the presently known references or work has the unique inventive technical feature of the present invention.

Furthermore, the scattershot of beacons transmitted by a DP, along with the awakening of a RF tag to receive the correct beacons at the correct time is counterintuitive. The reason that it is counterintuitive is because prior systems currently considered to offer the lowest possible power approach (such as Bluetooth low energy) would have the tags "transmit before listening" whereas this system has the tags "listen before transmitting." Thus, the prior art teaches away from the present invention and utilizing a "listen before transmitting" system is counterintuitive. Despite the prior art teaching away from the present invention, the latter is more energy efficient while maintaining a comparable level of accuracy.

Another inventive technical feature of the present invention is the definition of the recipient array as a series of bits with the bit associated with a RF tag set to 1 and all other bits set to 0. Without wishing to limit the invention to any theory or mechanism, it is believed that the technical feature of the present invention advantageously provides for a decrease in energy consumption by RF tags because it only needs to reference one bit instead of translating a binary number into a different form and referencing the result. None of the presently known prior references or work has the unique inventive technical feature of the present invention.

Furthermore, the definition of the recipient array as a series of bits with the bit associated with a RF tag set to 1 and all others set to 0 is counter intuitive. The reason that it is counter intuitive is because existing low power systems such as Bluetooth low energy transfer full ID information every time an equivalent tag wake up procedure is executed. Since unique ID bit fields can be 128 bits or more (for example a Bluetooth Low Energy UUID is 128 bits), one of ordinary skill in the art would expect this approach to use much more power and significantly reduce channel capacity if there are many tags. Thus, the recipient array format of the present invention is counterintuitive. Surprisingly, the energy used to transmit the large recipient arrays was balanced out by the savings in energy by simply having the tags reference an individual bit in the array instead of translating the number into a different form, resulting in lower energy consumption overall.

Another inventive technical feature of the present invention is the combination of a RF tag adjusting its clock to wake up at the right time to receive transmissions from a DP. Without wishing to limit the invention to any theory or mechanism, it is believed that the technical feature of the present invention advantageously provides for greater accuracy in the system of energy-efficient hibernation. None of the presently known prior references or work has the unique inventive technical feature of the present invention.

Furthermore, the RF tag adjusting its clock to wake up at the right time to receive transmissions from the DP is counterintuitive. The reason that it is counterintuitive is because in systems using unlicensed technologies such as WiFi or Bluetooth the long term clock accuracy and performance (such as drift and phase noise) of both tags and equivalent access points are not considered at system level as one skilled in the art would expect frequent clock adjustments to remedy these issues to consume excessive power and possibly reducing overall accuracy. For existing unlicensed systems and their corresponding standards, such parameters are only considered during active interactions and not considered over the longer term since unlicensed standard systems by nature rely on unsynchronized and coordinated network elements. Thus, the frequent adjustment of clocks in the tags is counterintuitive because prior art teaches away from this technique. Despite prior art teaching away from the present invention, the latter is able to utilize frequent clock adjustments for better long-term accuracy.

Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description and claims.

BRIEF DESCRIPTION OF THE SEVERAL VIEWS OF THE DRAWING(S)

The features and advantages of the present invention will become apparent from a consideration of the following detailed description presented in connection with the accompanying drawings in which:

FIG. 1 is a flowchart of a tag waking from energy-efficient hibernation to receive beacons broadcast by a detection point (DP). If the tag has moved, the tag may passively associate with a DP by determining a time to wake up and rendezvous with that DP when the DP is broadcasting beacons specific to that time slot. To conserve energy, the tag may announce its updated location to the DPs very infrequently. The tag may sleep until it's time to wake up and receive its beacons. Upon awakening, the tag may receive beacons and may confirm whether the beacons are beacons transmitted from the associated DP. Upon confirmation that the beacons are transmissions of the associated DP, the tag may correct its sloppy clock by phase-locking its sloppy clock with the signal.

FIG. 2 is a flowchart of a tag waking from energy-efficient hibernation to transmit beacons to a DP. If the tag has moved, the tag may passively associate with a DP by determining a time to wake up and rendezvous with that DP when the DP is broadcasting beacons specific to that time slot. To conserve energy, the tag may announce its updated location to the DPs very infrequently. The tag may sleep until it's time to wake up and transmit its beacons. Upon receiving the tag's transmitted beacons, the DP may confirm whether the beacons are from an associated tag. Upon confirmation that the beacons are transmissions of an associated tag, the DP may determine a difference between when the beacon was received and when it was expected. The DP may then delay future transmissions based on the time difference.

FIG. 3 is a flowchart of two-way authentication between a tag and a DP using a Root of Trust. The tag may receive a challenge from the DP. The tag may encrypt the challenge using a key that may be contained in the tag's Root of Trust. The encrypted response may then be verified using a database listing every Root of Trust, its key, and the corresponding tag.

FIG. 4 is a flowchart of a tag waking from energy-efficient hibernation to receive beacons broadcast by a DP. If the tag has moved, the tag may passively associate with a DP by determining a time to wake up and rendezvous with that DP when the DP is broadcasting beacons specific to that time slot. To conserve energy, the tag may announce its updated location to the DPs very infrequently. The tag may sleep until it's time to wake up and initiate a bare boot that readies the tag to meet its rendezvous in as little time as possible. The bare boot may be a system boot that goes directly from hibernation into an awakened state by omitting routine procedures such as performing system checks, reading all the memory locations to check for corruption, and checking the input/output (IO) of peripherals. While these routines are typically performed in the prior art, they are unnecessary in the present invention since only 30 seconds have passed since the previous boot and so corruption and failure are therefore highly unlikely. Moreover, abstention from these otherwise standard procedures yields significant power savings that enhance the economical energy efficiency of the invention.

FIG. 5 is a flowchart of a tag waking from energy-efficient hibernation to transmit beacons to a DP. If the tag has moved, the tag may passively associate with a DP by determining a time to wake up and rendezvous with that DP when the DP is broadcasting beacons specific to that time slot. To conserve energy, the tag may announce its updated location to the DPs very infrequently. The tag may sleep until it's time to wake up and initiate a bare boot that readies the tag to transmit its beacons as soon as possible. The bare boot may be a system boot that goes directly from hibernation into an awakened state by omitting routine procedures such as performing system checks, reading all the memory locations to check for corruption, and checking the IO of peripherals. While these routines are typically performed in the prior art, they are unnecessary in the present invention since only 30 seconds have passed since the previous boot and so corruption and failure are therefore highly unlikely. Moreover, abstention from these otherwise standard procedures yields significant power savings that enhance the economical energy efficiency of the invention.

FIG. 6 is a flowchart of a tag waking from energy-efficient hibernation every 30 seconds to received beacons broadcasted from a DP with emphasis added to the address structure and protocol. The address of the beacon's recipient may be determined from the array index of the bit that's equal to 1, where all other bits have been set to 0. If the address were a combination of bits in the array (e.g., a binary number of 7500 digits), there would have to be an extra step to translate that combination of bits into a base-10 number. There is less computation (and therefore less power consumed) by simply referencing each address to each array index.

FIG. 7 is a flowchart of a tag waking from energy-efficient hibernation to transmit beacons to a DP with emphasis added to the address structure and protocol. The address of the beacon's recipient may be determined from the array index of the bit that's equal to 1, where all other bits have been set to 0. If the address were a combination of bits in the array (e.g., a binary number of 7500 digits), there would have to be an extra step to translate that combination of bits into a base-10 number. There is less computation (and therefore less power consumed) by simply referencing each address to each array index.

Figure 10:
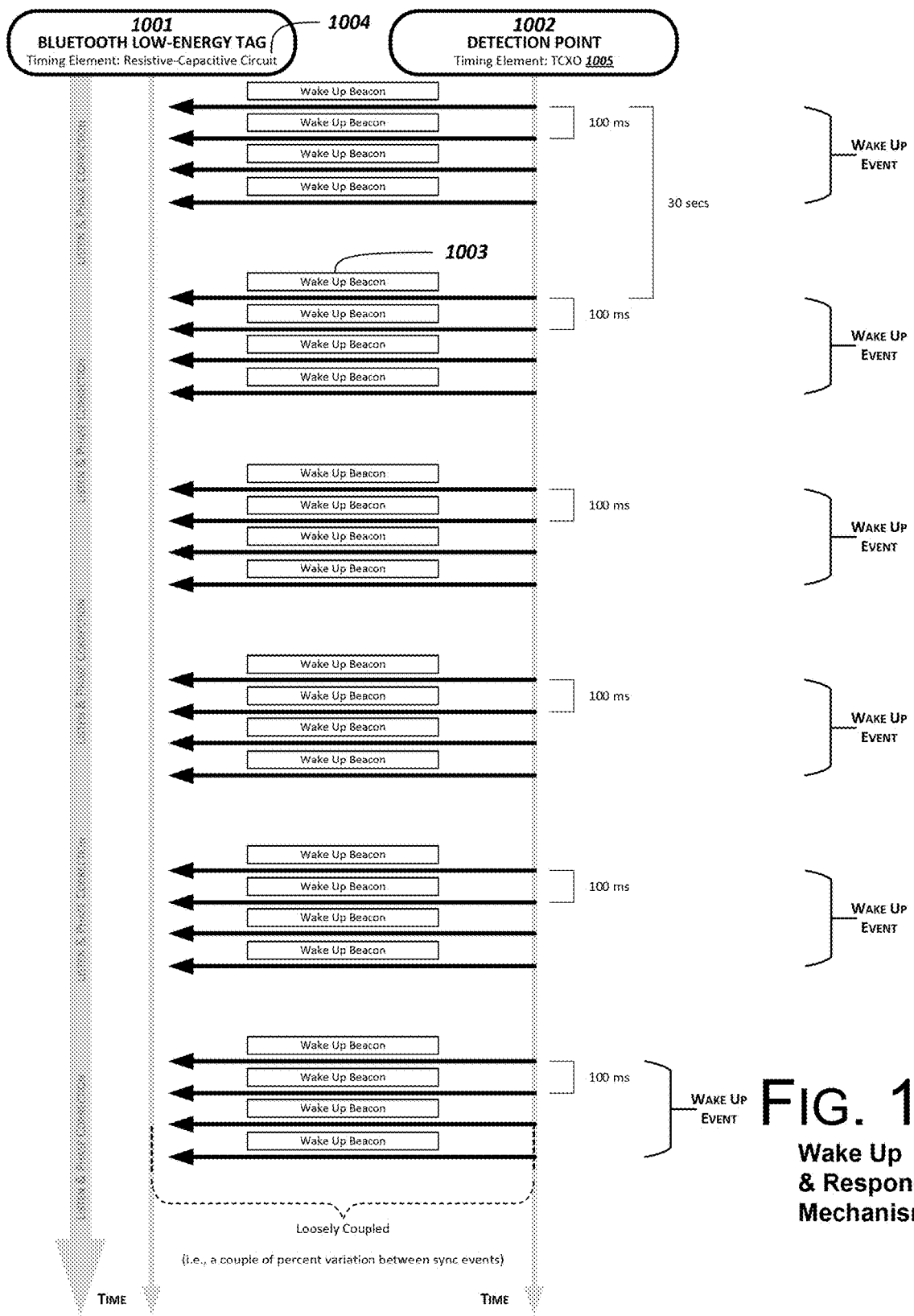

FIG. 10 is a timeline showing a wake-up & response mechanism between a loosely coupled Detection Point and Bluetooth Low-Energy (BLE) tag. The BLE tag may be scheduled to wake up every 30 seconds via a sloppy clock such as, for example, a resistive-capacitive circuit timing element. The detection point (DP) may transmit beacons according to its more precise clock, such as, for example, a temperature-compensated oscillator timing element. The DP may broadcast bursts of beacons to all possible recipients, and each burst may be specifically addressed to the respective recipient and transmitted at the scheduled time for rendezvous. At the rendezvous time, the BLE tag may receive the wake-up beacons transmitted by the DP and may undergo a phase correction to correct its sloppy clock according to the time the beacons were received.

Figure 11:
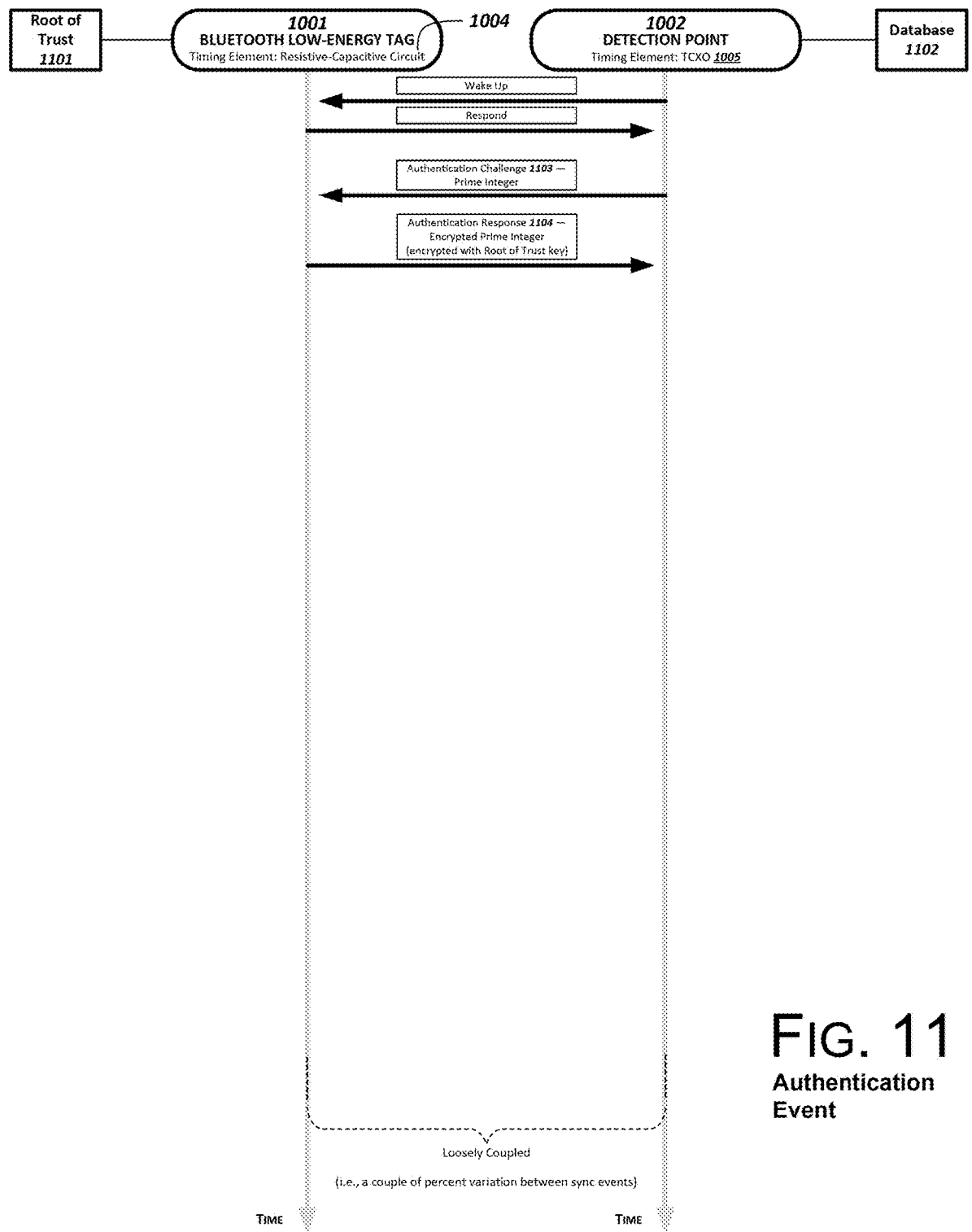

FIG. 11 is a timeline showing an authentication method between the DP and the tag. The DP may signal the tag to wake up (using the wake-up routine of FIG. 1) and the tag may acknowledge. Then, the devices may undergo a challenge-response protocol, wherein the tag may receive a challenge from the DP. The tag may encrypt the challenge using a key that may be contained in the tag's Root of Trust. The encrypted response may then be verified using a database listing every Root of Trust, its key, and the corresponding BLE tag.

Figure 12:
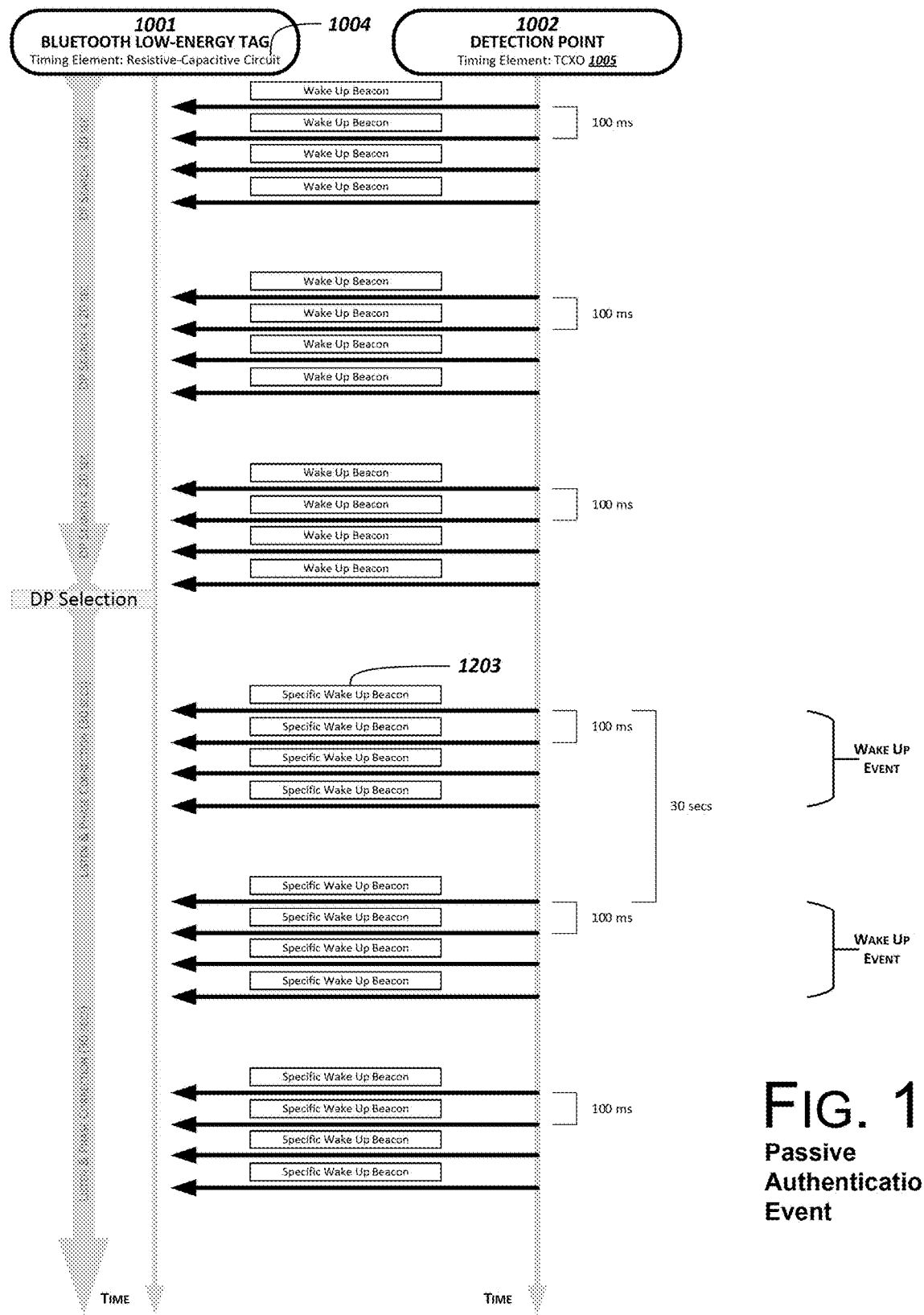

FIG. 12 is a timeline showing a passive association protocol. When the tag has lost communication with its associated DP, the tag may determine that it may have moved. The tag may listen for signals from any of the DPs and may select a DP from the received signals. For energy-efficiency, upon this selection, the tag may not transmit its association with the DP to the DP and may only determine a rendezvous time to receive the DP's beacons. Thus, the association with the DP may be passive since the DP may not be aware of this association until the tag broadcasts its updated location every 15 minutes.

Figure 13:
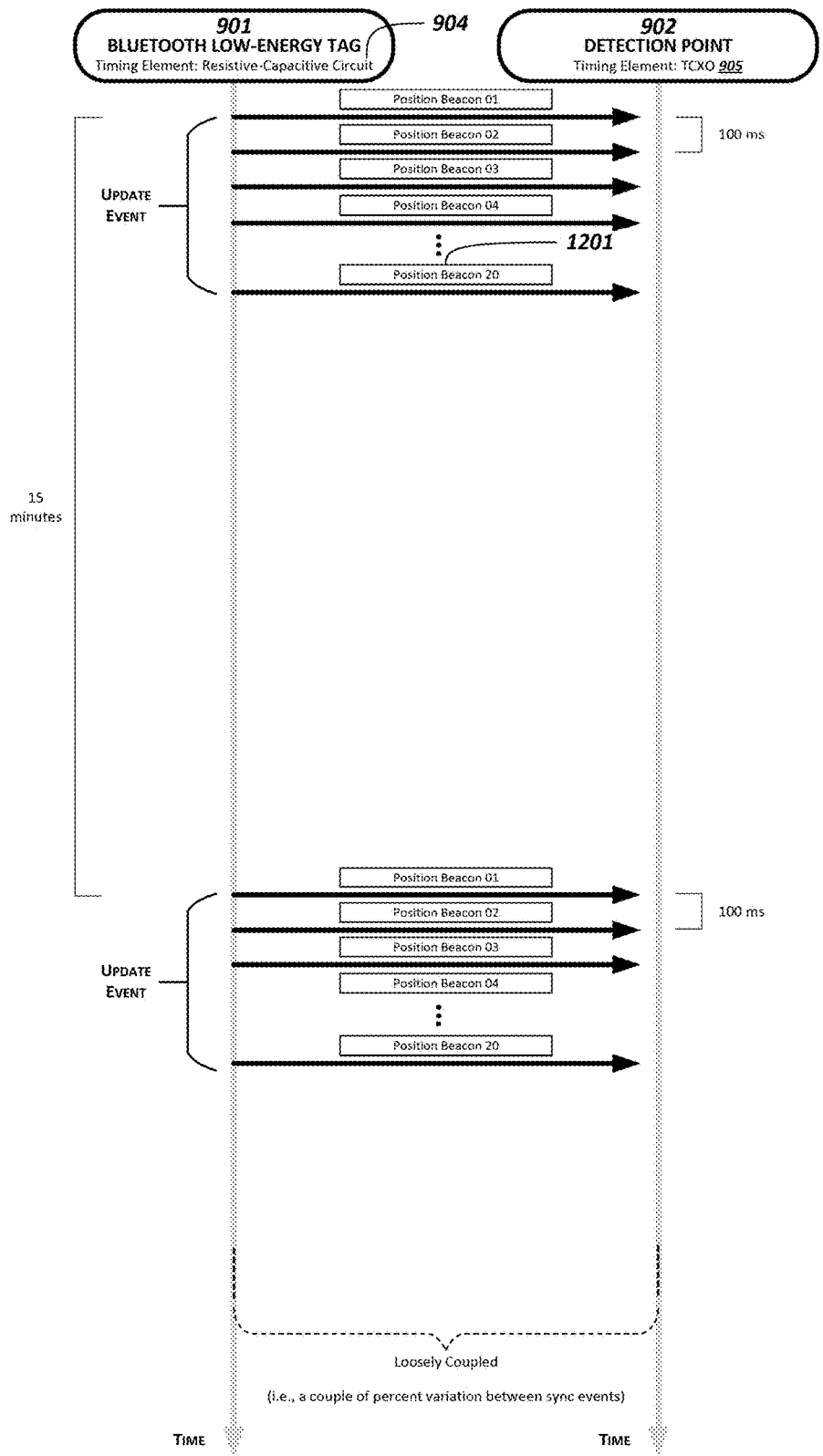

FIG. 13 is a timeline showing the tag signaling its updated location every 15 minutes to the DPs. The location signal may comprise 1 advertising packet (out of 20 packets total) transmitted every 100 ms.

Figure 14:
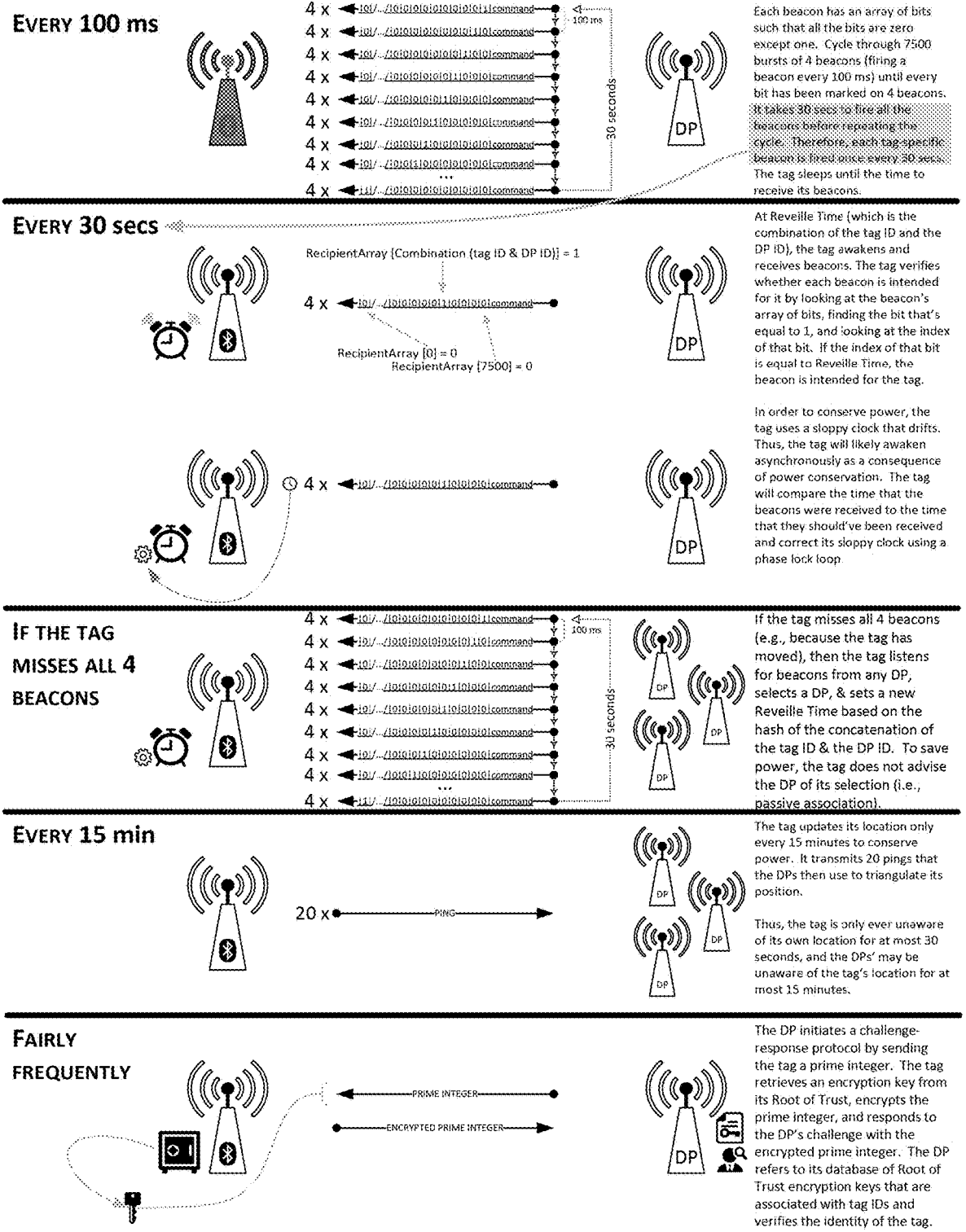

FIG. 14 is a diagram showing all cyclic processes. Further detail of the composition of the beacons is shown as well as the relationship between the RecipientArray index, the tag ID, and the DP ID. Emphasis has been added to key power-saving strategies such as an extended power-efficient sleep wherein the awakening is timed to receive the tag's intended beacons, the use of a phase lock loop to correct a power-efficient-but-sloppy clock, and synchronization with a DP's transmissions without transmitting a coordination, notification or acknowledgment for the DP (i.e., passive association).

Figure 15:
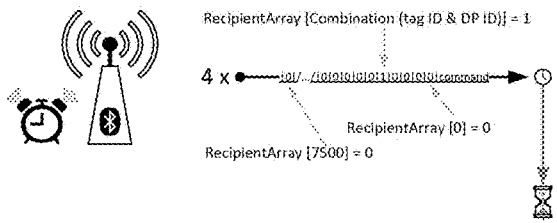
Figure 15:
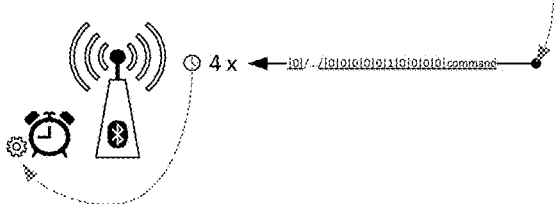
Figure 15:
Figure 15:
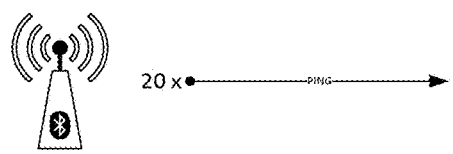

FIG. 15 is a diagram of a method wherein the tag awakens every 30 seconds and broadcasts beacons to the DP (instead of the DP broadcasting beacons to the tag every 30 seconds). While the DP can broadcast a burst of beacons for every bit in the RecipientArray in the preferred embodiment since it isn't subject to the energy conservation restraints of the tag, it's energy-inefficient for the tag to do so. Thus, since each tag only broadcasts to one DP, the tag saves energy by only broadcasting the beacons that are specifically directed to its passively-associated DP. Like the preferred embodiment, the tag still utilizes a sloppy clock as a power conservation feature. However, in this embodiment, the DP delays future responses according to the time difference.

Figure 16:
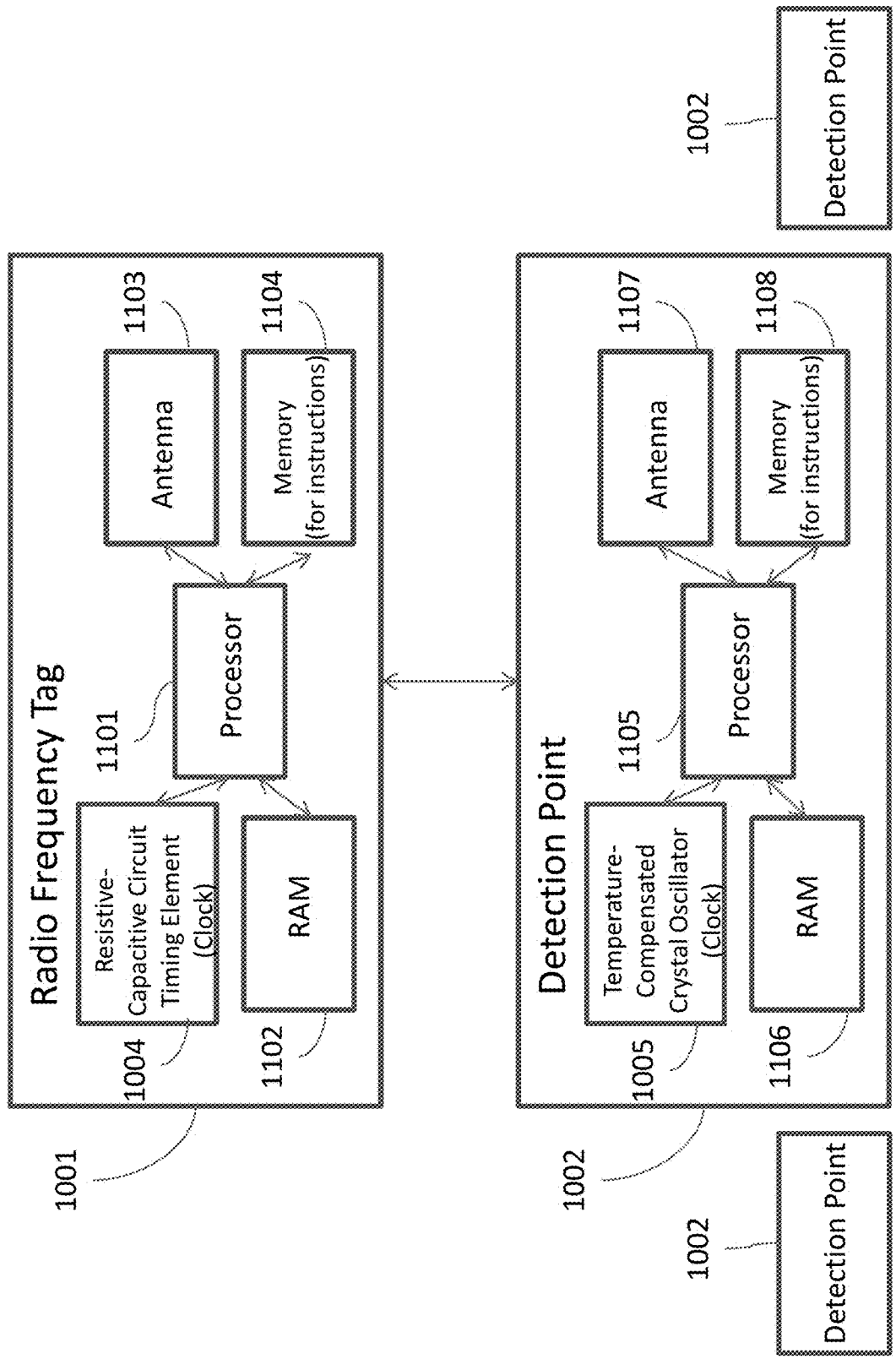

FIG. 16 is a diagram of a system of waking from energy-efficient hibernation to send or receive indoor localization beacons. The system may comprise a radiofrequency (RF) tag, and each RF tag may comprise a first processor capable of executing computer-executable instructions, a first randomly-accessed memory (RAM) device, a first antenna, a first memory device, and a resistive-capacitive circuit timing element (clock). The system may further comprise a plurality of detection points (DPs). Each DP in the plurality of DPs may comprise a second processor, a second RAM device, a second antenna, a second memory device, and a temperature-compensated crystal oscillator (clock). The RF tag may associate with one DP of the plurality of DPs.

Figure 17:
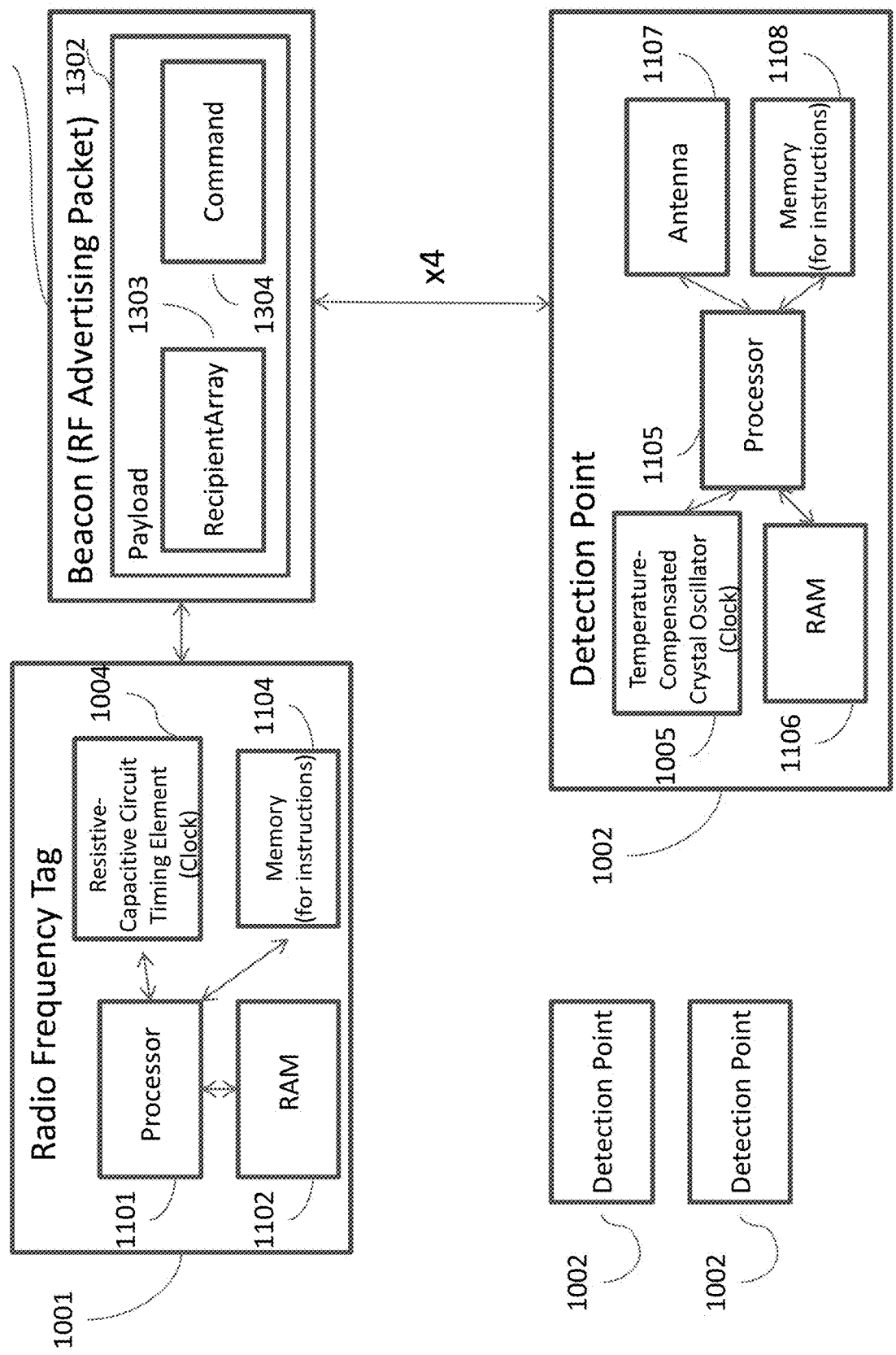

FIG. 17 is a diagram of a system for waking from energy-efficient hibernation to send or receive indoor localization beacons. The system may comprise a beacon in a plurality of beacons. Each beacon in the plurality of beacons may be a RF advertising packet comprising a payload. The payload may comprise a RecipientArray (an array of bits) and a command. The system may further comprise a RF tag. The RF tag may comprise a first processor, a first RAM device, a first memory device, and a resistive-capacitive circuit timing element (clock). The system may further comprise a plurality of detection points (DPs). Each DP in the plurality of DPs may comprise a second processor, a second RAM device, an antenna, a second memory device, and a temperature-compensated crystal oscillator (clock). The RF tag may send the beacon to a DP in the plurality of DPs.

DETAILED DESCRIPTION OF THE INVENTION

Figure 1:
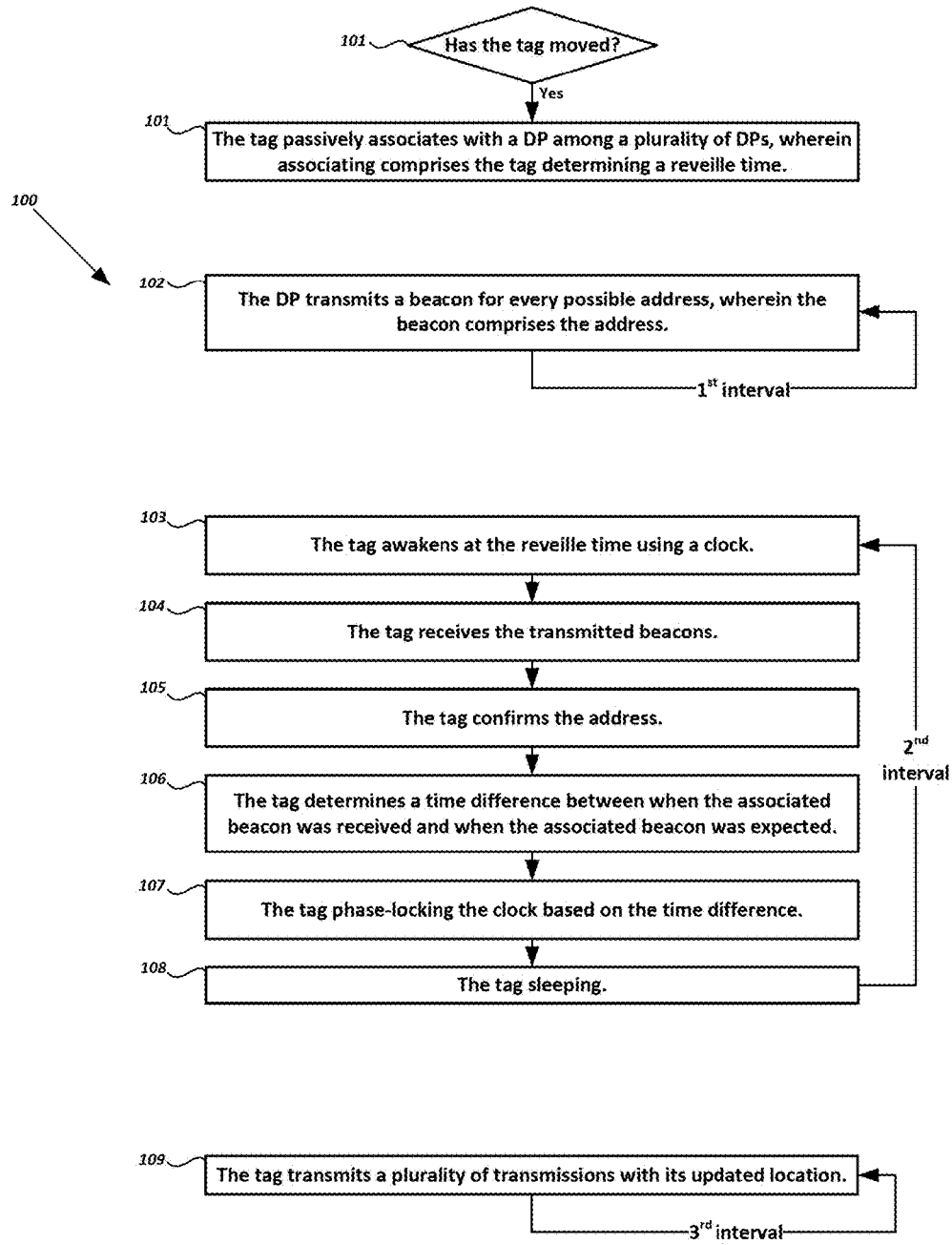

Following is a list of elements corresponding to a particular element referred to herein:

1001 tag/radiofrequency (RF) tag
1002 detection point (DP)
1003 first challenge integer in two-way authentication
1004 resistive-capacitive circuit timing element
1005 temperature-compensated crystal oscillator (TCXO) timing element
1006 second challenge integer in two-way authentication
1101 processor of tag/RF tag
1102 RAM device of tag/RF tag
1103 antenna of tag/RF tag
1104 memory device of tag/RF tag
1105 processor of DP
1106 RAM device of DP
1107 antenna of DP
1108 memory of DP
1201 transmission
1301 beacon (RF advertising packet)
1302 payload
1303 RecipientArray
1304 command Referring to FIG. 1, the present invention features a method (100) of waking from energy-efficient hibernation to receive indoor localization beacons. The energy-efficient state of hibernation may be defined as a state of extremely low battery usage. The extremely low battery usage state of a tag may consume approximately 1 µA/s per tag, compared to the approximate battery usage of an awakened state, 0.5 mA/s per tag. In some embodiments, the method may comprise passively associating (101) a tag (1001) with a detection point (DP) (1002) of a plurality of DPs if the tag (1001) has moved to a new location. The procedure for associating may comprise determining a reveille time. The method may further comprise the DP (1002) transmitting (102) at a first interval a beacon for every possible address. In some embodiments, the beacon may comprise the address. The method may further comprise the tag (1001) executing an awakening cycle (103) at a second interval at the reveille time using a clock (1004). The reveille time may be a value derived from at least one of a tag ID and a DP ID. In some embodiments, the reveille time is equal at least one of a hash or a concatenation of a tag ID and a DP ID and the clock may be a resistive-capacitive circuit timing element (1004). The reveille time may be calculated in a cloud server, a local server, a DP, a tag, or a combination thereof. The term "awakening" in the present invention refers to an act of waking from a low-power state, carrying out an action, and returning to said low-power state. The awakening cycle may comprise the awakened tag (1001) receiving (104) the transmitted beacons and confirming (105) the address. In some embodiments, the awakening cycle may further comprise determining (106) a time difference between when the beacon was received and when the beacon was expected, phase-locking (107) the clock based on the time difference, and returning to sleep (108). In some embodiments, the overall method may further comprise the tag (1001) transmitting (109) at a third interval a plurality of transmissions comprising the updated location of the tag (1001).

In some embodiments, the method may further comprise each DP (1002) of the plurality of DPs receiving the updated location and filtering noise associated with each transmission using a Kalman filter. The procedure for receiving through the use of the Kalman filter may comprise each DP (1002) of the plurality of DPs determining an Angle of Arrival of the Kalman-filtered transmission, and applying MUltiple Signal Classification (MUSIC) to improve the accuracy of the determined Angle of Arrival.

Figure 2:
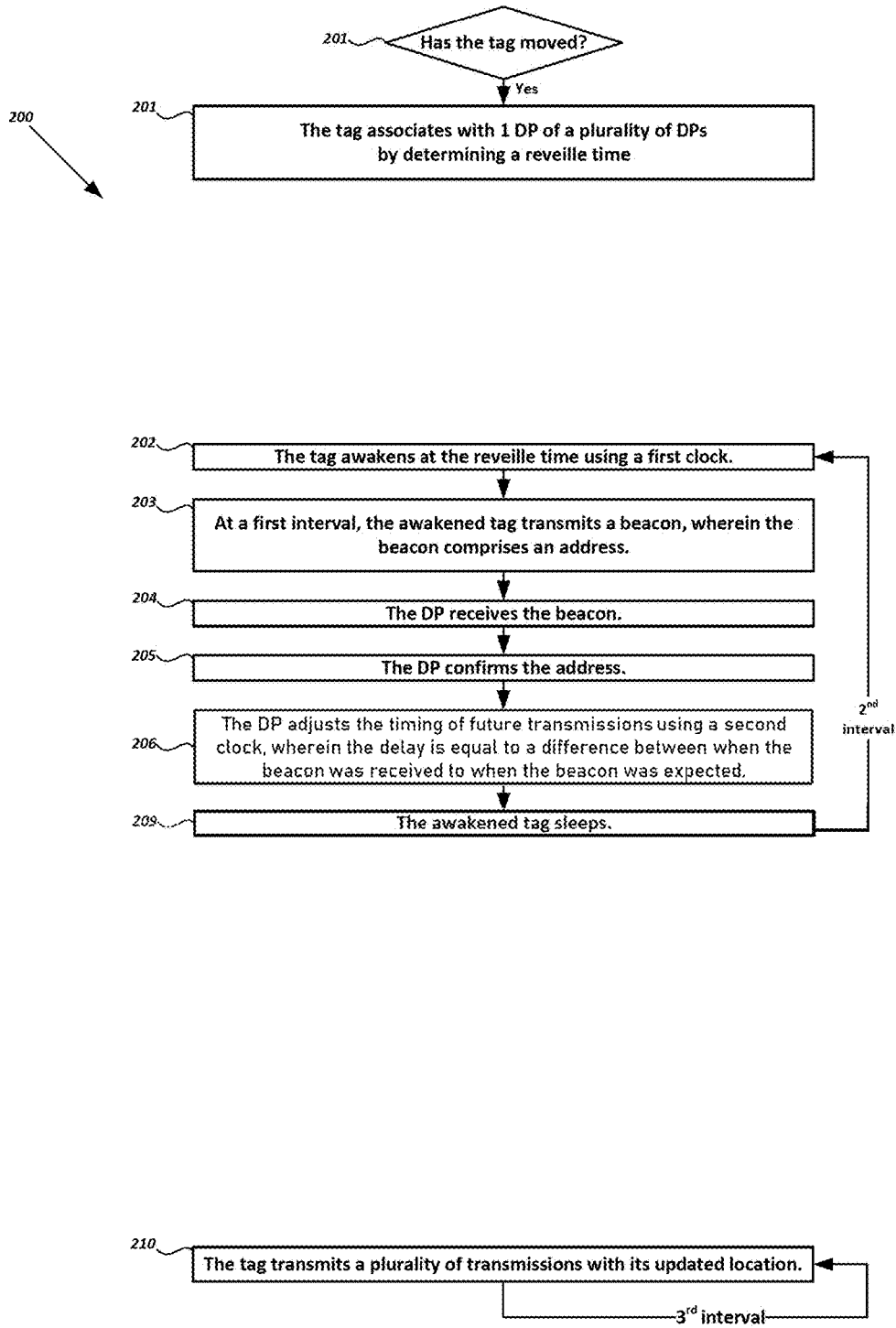

Referring to FIG. 2, the present invention features a method (200) of waking from energy-efficient hibernation to transmit an indoor localization beacon. In some embodiments, the method may comprise passively associating (201) a tag (1001) with a detection point (DP) of a plurality of DPs if the tag (1001) has moved to a new location. The procedure for associating may comprise the tag (1001) determining a reveille time. The reveille time may be a value derived from at least one of a tag ID and DP ID. In some embodiments, the reveille time is equal to at least one of a concatenation or hash of a tag ID and a DP ID, a geographic number, a location ID of a DP (1002) modified by a location ID of a tag (1001), or a combination thereof. The reveille time may be calculated in a cloud server, a local server, a DP, a tag, or a combination thereof. The method may further comprise the tag (1001) executing an awakening cycle (202) at a second interval at the reveille time using a first clock (1004). The term "awakening" in the present invention refers to an act of waking from a low-power state, carrying out an action, and returning to said low-power state. The first clock (1004) may be a resistive-capacitive circuit timing element (1004). The awakening cycle may comprise the awakened tag (1001) transmitting (203) a beacon at a first interval, the DP (1002) receiving (204) the beacon and the DP (1002) confirming (205) an address. In some embodiments, the beacon may comprise the address. In some embodiments, the awakening cycle may further comprise the DP (1002) delaying future transmissions using a second clock (1005). The second clock (1005) may be a temperature-compensated crystal oscillator (TCXO) timing element (1005). In some embodiments, the delay may be equal to a difference between when the beacon was received to when the beacon was expected. The awakened tag (1001) may return to sleep (209). The method may further comprise transmitting (210) a plurality of transmissions comprising the updated location of the tag (1001) from the tag (1001) at a third interval.

In some embodiments, the method may further comprise each DP (1002) of the plurality of DPs receiving the updated location and filtering noise associated with each transmission using a Kalman filter. The procedure for receiving through the use of the Kalman filter may comprise each DP (1002) of the plurality of DPs determining an Angle of Arrival of the Kalman-filtered transmission, and applying MUltiple Signal Classification (MUSIC) to improve the accuracy of the determined Angle of Arrival.

Figure 3:
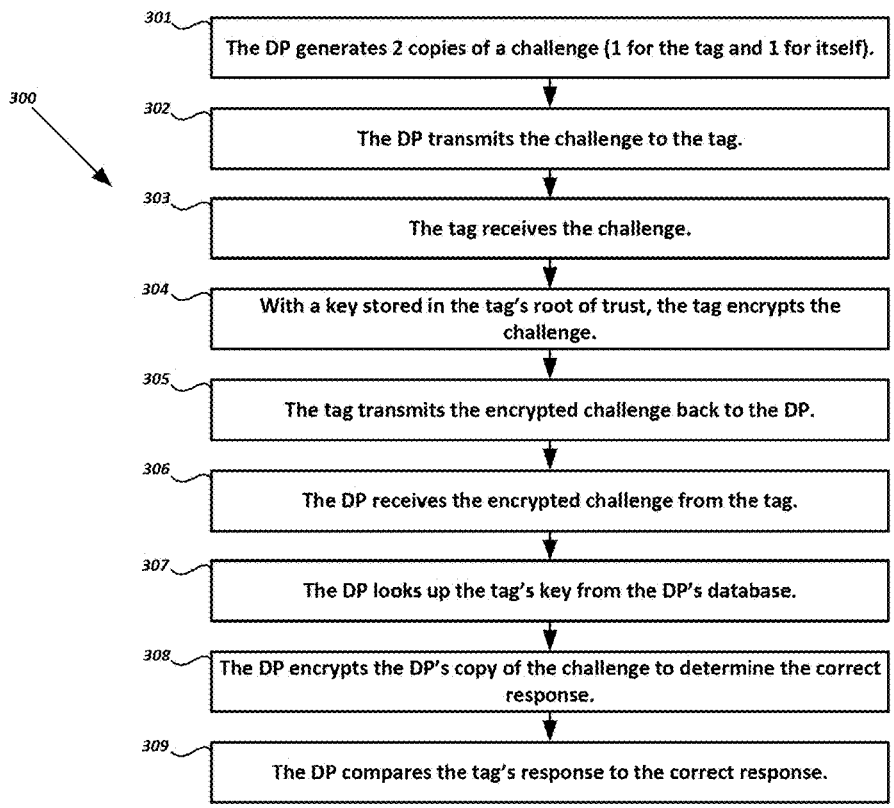

Referring to FIG. 3, the present invention features a method (300) of two-way authentication between a tag (1001) and a DP (1002). In some embodiments, the method may comprise a DP (1002) generating (301) a first challenge (1003) and a second challenge (1005) equal to each other. In some embodiments, the first challenge and the second challenge are prime integers. The method may further comprise the DP (1002) transmitting (302) the first challenge (1003) to the tag (1001). The tag (1001) may comprise a tag ID and a root of trust (1001), wherein the root of trust (1001) further comprises a first encryption key. The method further comprises the tag (1001) receiving (303) the transmitted first challenge (1003), encrypting (304) the first challenge (1003) using the first encryption key, and transmitting (305) the encrypted first challenge (1004) to the DP (1002). The DP (1002) may comprise a database (1002) and the database (1002) may further comprise a plurality of second encryption keys, each associated with the respective tag ID. The method further comprises the DP (1002) receiving (306) the transmitted encrypted first challenge (1004), retrieving (307) the second encryption key associated with the respective tag ID of the tag (1001) from the database (1002), encrypting (308) the second challenge (1005) using the second encryption key, and authenticating (309) the tag (1001) by comparing the received encrypted first challenge (1004) to the encrypted second challenge (1006). In some embodiments, the method may use, on average, less than 250 nano-Watts.

Figure 4:
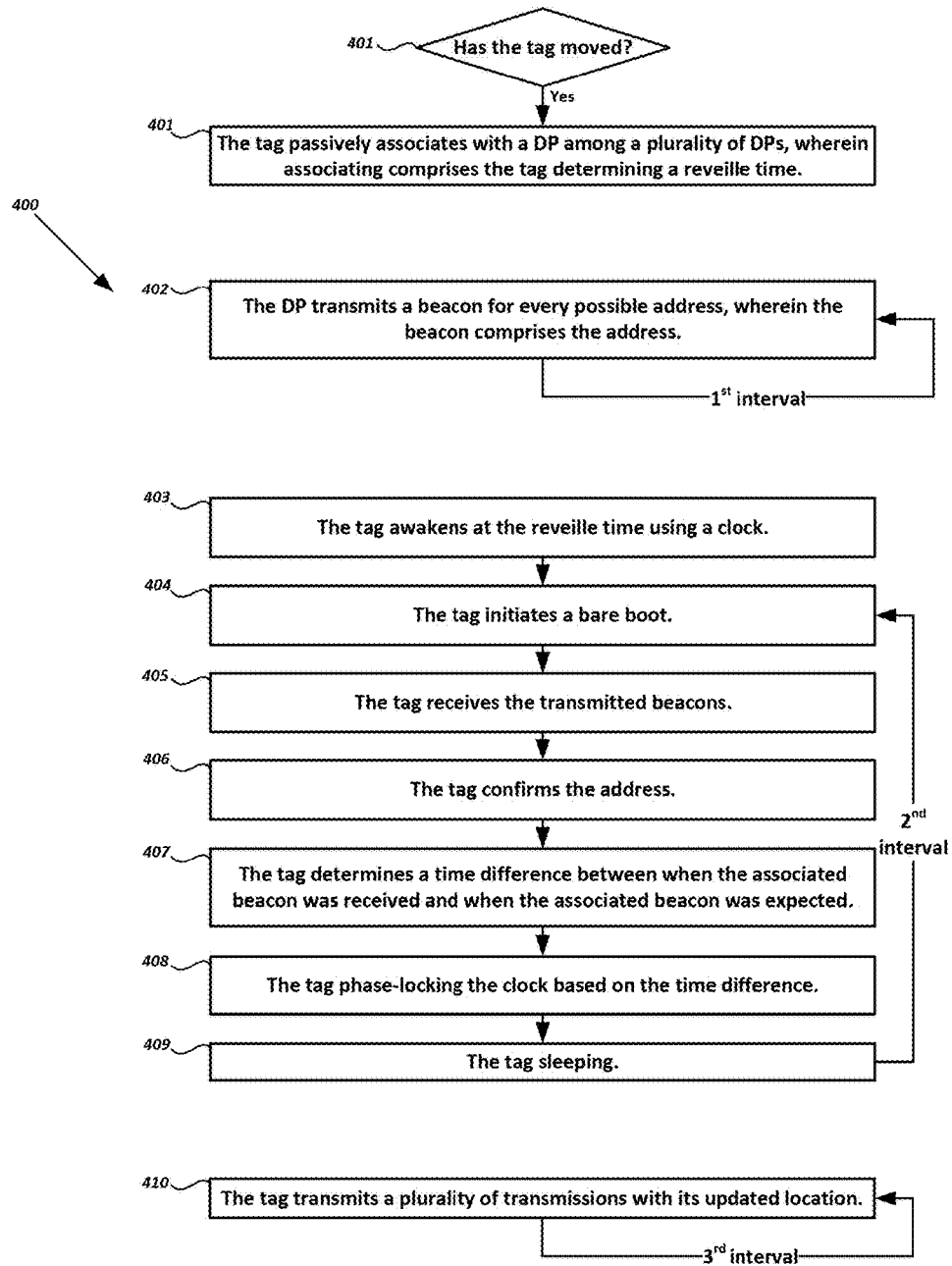

Referring to FIG. 4, the present invention features a method (400) of waking from energy-efficient hibernation to receive indoor localization beacons by initiating a bare boot. In some embodiments, the method may comprise a tag (1001) passively associating (401) with a detection point (DP) of a plurality of DPs if the tag (1001) has moved to a new location. The procedure for associating may comprise the tag (1001) determining a reveille time. In some embodiments, the reveille time is equal to at least one of a concatenation or hash of a tag ID and a DP ID, a geographic number, a location ID of a DP (1002) modified by a location ID of a tag (1001), or a combination thereof. The method may further comprise the DP (1002) transmitting (402) at a first interval a beacon comprising an address for every possible address, and the tag (1001) executing an awakening cycle (403) at a second interval at the reveille time using a clock. The first clock (1004) may be a resistive-capacitive circuit timing element (1004). The term "awakening" in the present invention refers to an act of waking from a low-power state, carrying out an action, and returning to said low-power state. The awakening cycle may comprise the awakened tag (1001) initiating (404) a bare boot, receiving (405) the transmitted beacons, confirming (406) the address, determining (407) a time difference between when the beacon was received and when the beacon was expected, phase-locking (408) the clock based on the time difference, and returning to sleep (409). In some embodiments, the bare boot may comprise booting from hibernation directly into an awakened state. The bare boot may boot from hibernation directly into an awakened state by foregoing system checks, reading memory locations to check for corruption, checking the input/output (IO) of peripherals, etc., thus resulting in a more energy-efficient booting method. In an exemplary embodiment, the average energy consumption of bare booting a RF tag (1001) may be lower than the average energy consumption of booting the RF tag (1001) normally (15 mW/ms), e.g. 10 mW/ms. The method may further comprise the tag (1001) transmitting (410) at a third interval a plurality of transmissions comprising the updated location of the tag (1001).

In some embodiments, the method may further comprise each DP (1002) of the plurality of DPs receiving the updated location and filtering noise associated with each transmission using a Kalman filter. The procedure for receiving through the use of the Kalman filter may comprise each DP (1002) of the plurality of DPs determining an Angle of Arrival of the Kalman-filtered transmission, and applying MUltiple Signal Classification (MUSIC) to improve the accuracy of the determined Angle of Arrival. In some embodiments, a second clock (1005), associated with the DP (1002) is a TCXO timing element (1005).

Figure 5:
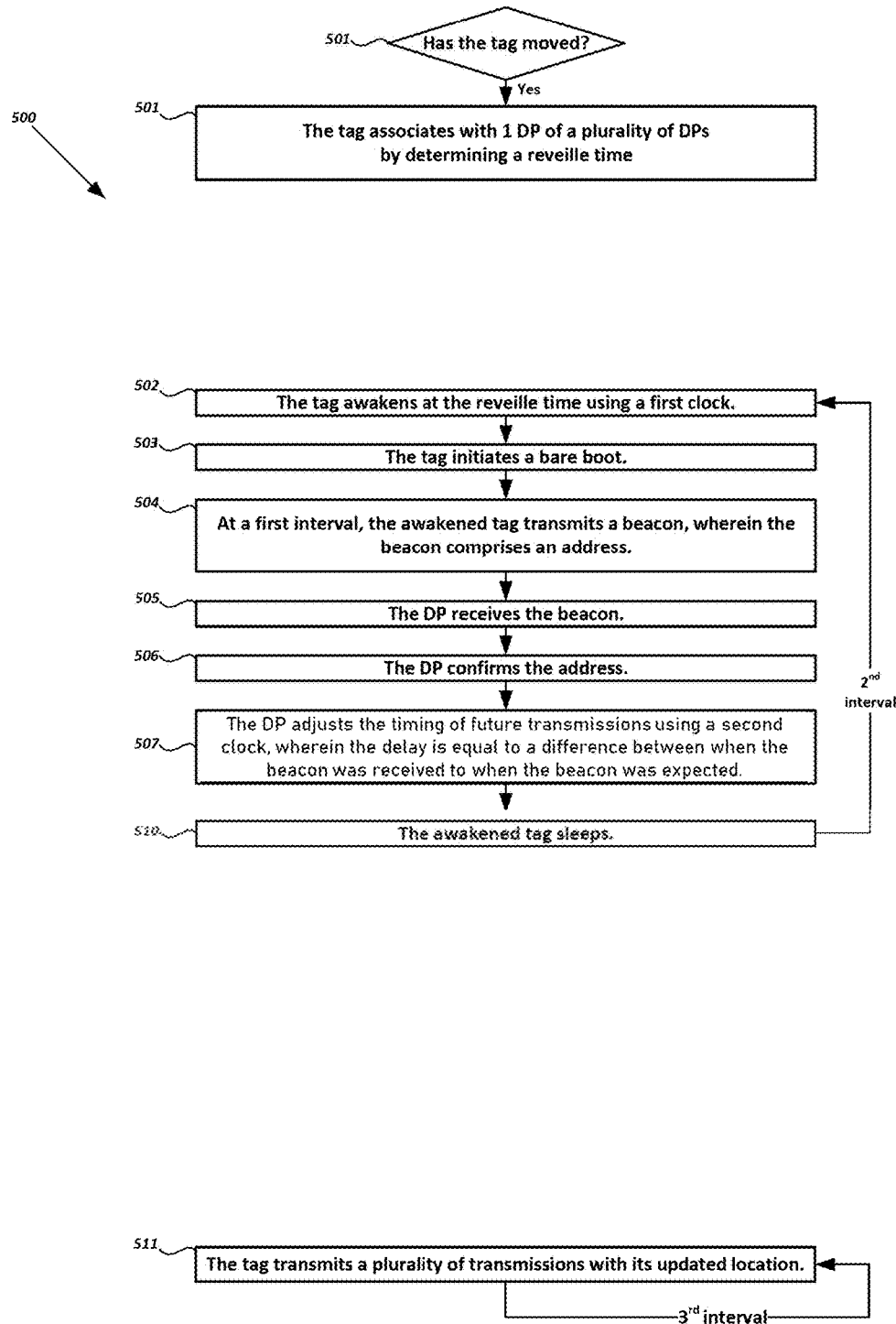

Referring to FIG. 5, the present invention features a method (500) of waking from energy-efficient hibernation to transmit an indoor localization beacon by initiating a bare boot. In some embodiments, the method may comprise a tag (1001) passively associating (501) with a detection point (DP) (1002) of a plurality of DPs if the tag (1001) has moved to a new location. The procedure for associating may comprise the tag (1002) determining a reveille time. In some embodiments, the reveille time is equal to at least one of a hash or a concatenation of a tag ID and a DP ID. The method may further comprise the tag (1001) executing an awakening cycle (502) at a second interval at the reveille time using a first clock (1004). The first clock (1004) may be a resistive-capacitive circuit timing element (1004). The term "awakening" in the present invention refers to an act of waking from a low-power state, carrying out an action, and returning to said low-power state. The awakening cycle may further comprise the tag (1001) initiating (503) a bare boot, and transmitting (504) at a first interval a beacon that may comprise an address. In some embodiments, the bare boot may comprise booting from hibernation directly into an awakened state. The bare boot may boot from hibernation directly into an awakened state by foregoing system checks, reading memory locations to check for corruption, checking the IO of peripherals, etc., thus resulting in a more energy-efficient booting method. In an exemplary embodiment, the average energy consumption of bare booting a RF tag (1001) may be lower than the average energy consumption of booting the RF tag (1001) normally (15 mW/ms), e.g. 10 mW/ms. The awakening cycle may further comprise the DP (1002) receiving (505) the beacon, confirming (506) the address, and delaying future transmissions using a second clock (1005). The second clock (1005) may be a TOXO timing element (1005). The delay may be equal to a difference between when the beacon was received to when the beacon was expected. The awakened tag (1001) may return to sleep. The method may further comprise that tag (1001) transmitting (511) at a third interval a plurality of transmissions comprising the updated location of the tag (1001).

In some embodiments, the method may further comprise each DP (1002) of the plurality of DPs receiving the updated location and filtering noise associated with each transmission using a Kalman filter. The procedure for receiving through the use of the Kalman filter may comprise each DP (1002) of the plurality of DPs determining an Angle of Arrival of the Kalman-filtered transmission, and applying MUltiple Signal Classification (MUSIC) to improve the accuracy of the determined Angle of Arrival.

Referring to FIG. 16, the present invention features a system of waking from energy-efficient hibernation to receive indoor localization beacons. This beacon is a radiofrequency (RF) advertising packet that may comprise an array of address bits. The system may comprise a RF tag (1001), that may comprise a first processor (1101) capable of executing computer-executable instructions, a first randomly-accessed memory (RAM) component (1102), a first antenna (1103), and a first memory component (1104). The memory may comprise instructions for associating (101) with a detection point (DP) of a plurality of DPs if the tag (1001) has moved to a new location. The procedure for associating may comprise determining a reveille time based on a combination of a tag ID and a DP ID of the associated DP (1002). In some embodiments, the reveille time may be equal at least one of a hash or a concatenation of a tag ID and a DP ID. The memory may further comprise instructions for executing an awakening cycle (103) at a second interval at the reveille time using a clock (1004). The term "awakening" in the present invention refers to an act of waking from a low-power state, carrying out an action, and returning to said low-power state. The awakening cycle may comprise receiving (104) beacons, confirming (105) an address, determining (106) a time difference between when the beacons were received and when the beacons were expected, phase-locking (107) the clock (1004) based on the time difference, and returning to sleep (108). The memory may also comprise of instructions for updating at a third interval the location of the tag (1001). The updating procedure may comprise transmitting (109) at a third interval a plurality of transmissions comprising the updated location of the tag (1001).

In some embodiments, the system may further comprise the DP (1002). The DP may comprise a second processor (1105) capable of executing computer-executable instructions, a second RAM component (1106), a second antenna (1107), and a second memory component (1108). The memory may further comprise instructions for transmitting (102) at a first interval the beacon for every possible address, wherein the beacon comprises the address.

In some embodiments, the memory (1108) of the DP (1002) may further comprise instructions for receiving the updated location and filtering noise associated with each transmission using a Kalman filter. The procedure for receiving through the use of the Kalman filter may comprise determining an Angle of Arrival of the Kalman-filtered transmission, and applying MUltiple Signal Classification (MUSIC) to improve the accuracy of the determined Angle of Arrival.

In some embodiments, the first clock (1004), associated with the RF tag (1001), is a resistive-capacitive circuit timing element (1004) and the second clock (1005), associated with the DP (1002), is a TCXO timing element (1005).

Referring again to FIG. 16, the present invention features a system for waking from energy-efficient hibernation to transmit an indoor localization beacon. In some embodiments, the system may comprise a RF tag (1001). The tag may comprise a first processor (1101) capable of executing computer-executable instructions, a first RAM component (1102), a first antenna (1103), and a first memory component (1104). The memory may comprise instructions for passively associating (201) with a DP of a plurality of DPs if the tag (1001) has moved to a new location. The association procedure may comprise determining a reveille time. In some embodiments, the reveille time may be equal at least one of a hash or a concatenation of a tag ID and a DP ID. The memory may further comprise instructions for executing an awakening cycle (202) at a second interval at the reveille time using a first clock (1004). The term "awakening" in the present invention refers to an act of waking from a low-power state, carrying out an action, and returning to said low-power state. The awakening cycle may comprise transmitting (203) at a first interval a beacon comprising an address and returning to sleep (209). The memory may further comprise instructions for transmitting (210) at a third interval a plurality of transmissions comprising the updated location of the tag (1001).

In some embodiments, the system may further comprise the DP (1002). The DP may comprise a second processor (1105) capable of executing computer-executable instructions, a second RAM component (1106), a second antenna (1107), and a second memory component (1108). The memory may comprise instructions for receiving (204) the beacon, confirming (205) the address, and delaying (206) future transmissions to the RF tag (1001) using a second clock (1005). In some embodiments, the delay may be equal to a difference between when the beacon was received to when the beacon was expected.

In some embodiments, the memory (1108) of the DP (1002) further comprises instructions for receiving the updated location and filtering noise associated with each transmission using a Kalman filter. The procedure for receiving through the use of the Kalman filter may comprise determining an Angle of Arrival of the Kalman-filtered transmission, and applying MUltiple Signal Classification (MUSIC) to improve the accuracy of the determined Angle of Arrival.

In some embodiments, the first clock (1004), associated with the RF tag (1001) is a resistive-capacitive circuit timing element (1004) and the second clock (1005), associated with the DP (1002) is a TCXO timing element (1005).

Referring again to FIG. 16, the present invention features a system of waking from energy-efficient hibernation to receive indoor localization beacons by initiating a bare boot. The beacon may be a RF advertising packet comprising an array of address bits. In some embodiments, the system comprises a RF tag (1001). The RF tag may comprise a first processor (1101) capable of executing computer-executable instructions, a first RAM component (1102), a first antenna (1103), and a first memory component (1104). The memory may comprise instructions for associating (401) with a DP of a plurality of DPs if the tag (1001) has moved to a new location. The procedure for associating may further comprise determining a reveille time based on a combination of a tag ID and a DP ID of the associated DP (1002). In some embodiments, the reveille time may be equal at least one of a hash or a concatenation of a tag ID and a DP ID. The memory may further comprise instructions for executing an awakening cycle (403) at a second interval at the reveille time using a first clock (1004). The term "awakening" in the present invention refers to an act of waking from a low-power state, carrying out an action, and returning to said low-power state. The awakening cycle may further comprise initiating (404) a bare boot, receiving (405) beacons, confirming (406) an address, determining (407) a time difference between when the beacons were received and when the beacons were expected, phase-locking (408) the clock (1004) based on the time difference, and returning to sleep (409). The memory may further comprise instructions for updating at a third interval the location of the tag (1001). The updating procedure may further comprise transmitting (410) at a third interval a plurality of transmissions comprising the updated location of the tag (1001).

In some embodiments, the system may further comprise the DP (1002). The DP may comprise a second processor (1105) capable of executing computer-executable instructions, a second RAM (1106), a second antenna (1107), and a second memory component (1108). The memory may comprise instructions for transmitting (403) at a first interval the beacon for every possible address, wherein the beacon comprises the address.

In some embodiments, the memory (1108) of the DP (1002) may further comprise instructions for receiving the updated location and filtering noise associated with each transmission using a Kalman filter. The procedure for receiving through the use of the Kalman filter may comprise determining an Angle of Arrival of the Kalman-filtered transmission, and applying MUltiple Signal Classification (MUSIC) to improve the accuracy of the determined Angle of Arrival.

In some embodiments, the first clock (1004), associated with the RF tag (1001), is a resistive-capacitive circuit timing element (1004) and the second clock (1005), associated with the DP (1002), is a TCXO timing element (1005).

Referring again to FIG. 16, the present invention features a system for waking from energy-efficient hibernation to transmit an indoor localization beacon by initiating a bare boot. In some embodiments, the system may comprise a RF tag (1001). The RF tag may comprise a first processor (1101) capable of executing computer-executable instructions, a first RAM component (1102), a first antenna (1103), and a first memory component (1104). The memory may comprise instructions for passively associating (501) with a DP of a plurality of DPs if the tag (1001) has moved to a new location. The procedure for associating may comprise determining a reveille time. In some embodiments, the reveille time may be equal at least one of a hash or a concatenation of a tag ID and a DP ID. The memory may further comprise instructions for executing an awakening cycle (502) at a second interval at the reveille time using a first clock (1004). The awakening cycle may further comprise initiating (503) a bare boot, transmitting (503) at a first interval a beacon that may comprise an address, and returning to sleep (510). The memory may further comprise instructions for transmitting (511) at a third interval a plurality of transmissions comprising the updated location of the tag (1001).

In some embodiments, the system may further comprise the DP (1002). The DP may comprise a second processor (1105) capable of executing computer-executable instructions, a second RAM component (1106), a second antenna (1107), and a second memory component (1108). The memory may comprise instructions for receiving (504) the beacon, confirming (505) the address, and delaying (506) future transmission to the RF tag (1001) using a second clock (1005). The delay may be equal to a difference between when the beacon was received to when the beacon was expected.

In some embodiments, the memory (1108) of the DP (1002) may further comprise instructions for receiving the updated location and filtering noise associated with each transmission using a Kalman filter. The procedure for receiving through the use of the Kalman filter may comprise determining an Angle of Arrival of the Kalman-filtered transmission, applying MUltiple Signal Classification (MUSIC) to improve the accuracy of the determined Angle of Arrival.

In some embodiments, the first clock (1004), associated with the RF tag (1001), is a resistive-capacitive circuit timing element (1004) and the second clock (1005), associated with the DP (1002), is a TOXO timing element (1005).

Referring again to FIG. 16, the present invention features a system of waking from energy-efficient hibernation to receive indoor localization beacons by initiating a WakeUp subroutine. The system may comprise a tag (1001). The tag may comprise a first processor (1101) capable of executing computer-executable instructions, a first RAM component (1102), a first antenna (1103), and a first memory component (1104). The memory may comprise instructions for passively associating (601) with a DP (1002) of a plurality of DPs if the tag (1001) has moved to a new location. The procedure for associating may comprise determining a reveille time to transmit a beacon addressed to the DP (1002). In some embodiments, the reveille time may be equal at least one of a hash or a concatenation of a tag ID and a DP ID. The memory further comprises instructions for executing a WakeUp subroutine every 30 seconds. The WakeUp subroutine may comprise executing an awakening cycle (603) at the reveille time using a first clock (1004), receiving (604) at least one of 4 beacons, and confirming that each received beacon of the at least 4 beacons is addressed to the tag (1001). The procedure for confirming may comprise finding (605) the bit in the array that is equal to 1, and verifying (606) whether the array index of the found bit is equal to reveille time. The WakeUp subroutine may further comprise phase-locking (607) the first clock (1004) based on a difference between when the beacon was received and when the beacon was expected, sleeping (608), and broadcasting (609) 20 transmissions (1201) to the plurality of DPs every 15 minutes at a rate of 1 transmission every 100 milliseconds. Each of the 20 transmissions (1201) may comprise an updated location of the tag (1001).

In some embodiments, the system may further comprise the DP (1002). The DP may comprise a second processor (1105) capable of executing computer-executable instructions, a second RAM component (1106), a second antenna (1107), and a second memory (1108). The memory may comprise instructions for transmitting (602) every 100 milliseconds the beacon 4 times for every array index of the array. The beacon may comprise the array of bits and wherein the bit located at the array index that is equal to reveille time is set to 1 and all other bits are set to 0.

In some embodiments, each DP (1002) of the plurality of DPs may receive the updated location and filtering noise associated with each transmission using a Kalman filter. The procedure for receiving through the use of the Kalman filter may comprise determining, by each DP (1002) of the plurality of DPs, an Angle of Arrival of the Kalman-filtered transmission, and applying, by each DP (1002) of the plurality of DPs, MUltiple Signal Classification (MUSIC) to improve the accuracy of the determined Angle of Arrival.

In some embodiments, the first clock (1004), associated with the tag (1001), is a resistive-capacitive circuit timing element (1004) and the second clock (1005), associated with the DP (1002), is a TCXO timing element (1005).

Referring again to FIG. 16, the present invention features a system of waking from energy-efficient hibernation to transmit an indoor localization beacon by initiating a WakeUp subroutine. In some embodiments, the system may comprise a tag (1001). The tag may comprise a first processor (1101) capable of executing computer-executable instructions, a first RAM component (1102), a first antenna (1103), and a first memory component (1104). The memory may comprise instructions for passively associating (701) the tag (1001) with a DP (1002) of a plurality of DPs if the tag (1001) has moved to a new location. The procedure for associating may comprise determining a reveille time to transmit a beacon addressed to the DP (1002) from the tag (1001). In some embodiments, the reveille time may be equal at least one of a hash or a concatenation of a tag ID and a DP ID. The memory may further comprise instructions for executing a WakeUp subroutine every 30 seconds. The WakeUp subroutine may comprise executing an awakening cycle (702) at the reveille time using a first clock (1004), and transmitting (703) the beacon comprising an array of bits from the tag (1001). The term "awakening" in the present invention refers to an act of waking from a low-power state, carrying out an action, and returning to said low-power state. In some embodiments, the bit located at an array index that is equal to reveille time is set to 1 and all other bits are set to 0. The WakeUp subroutine may further comprise returning to sleep (710), and broadcasting (711) 20 transmissions (1201) to the plurality of DPs every 15 minutes at a rate of 1 transmission every 100 milliseconds. Each of the 20 transmissions (1201) may comprise an updated location of the tag (1001).

In some embodiments, the system may further comprise a DP (1002). The DP may comprise a second processor (1105) capable of executing computer-executable instructions, a second RAM component (1106), a second antenna (1107), and a second memory component (1108). The memory may comprise instructions for receiving (704) the beacon in the DP (1002), and confirming that the beacon is addressed to the DP (1002). The procedure for confirming may comprise finding (705) the bit in the array that is equal to 1, and verifying (706) whether the array index of the found bit is equal to reveille time. The memory may further comprise instructions for the DP (1002) adjusting its timing of future transmissions to the tag (1001) according to a delay that is equal to a difference between when the beacon was received and when the beacon was expected using a second clock (1005).

In some embodiments, each DP (1002) of the plurality of DPs may receive the updated location and filtering noise associated with each transmission using a Kalman filter. The procedure for receiving through the use of the Kalman filter may comprise determining, by each DP (1002) of the plurality of DPs, an Angle of Arrival of the Kalman-filtered transmission, and applying, by each DP (1002) of the plurality of DPs, MUltiple Signal Classification (MUSIC) to improve the accuracy of the determined Angle of Arrival.

In some embodiments, the first clock (1004), associated with the tag (1001), is a resistive-capacitive circuit timing element (1004) and the second clock (1005), associated with the DP, is a TCXO timing element (1005).

In some embodiments of the present invention, the frequency at which a system executes a WakeUp subroutine may be increased in order for a DP (1002) to reach a greater plurality of tags in a sector or to account for noise. The frequency at which the system executes a WakeUp subroutine may also be decreased for a smaller plurality of tags in a sector. In some embodiments, a tag (1001) will await a transmission from a DP (1002) at reveille time for a specific amount of time before timing out and returning to sleep. In other embodiments, a tag (1001) will continue waiting for a transmission by a DP (1002) at reveille time until a transmission is received. In some embodiments, a DP (1002) may send an alert to a higher-level layer of a network when an unresponsive tag (1001) is detected.

EXAMPLE

The following is a non-limiting example of the present invention. It is to be understood that said example is not intended to limit the present invention in any way. Equivalents or substitutes are within the scope of the present invention.

Figure 6:
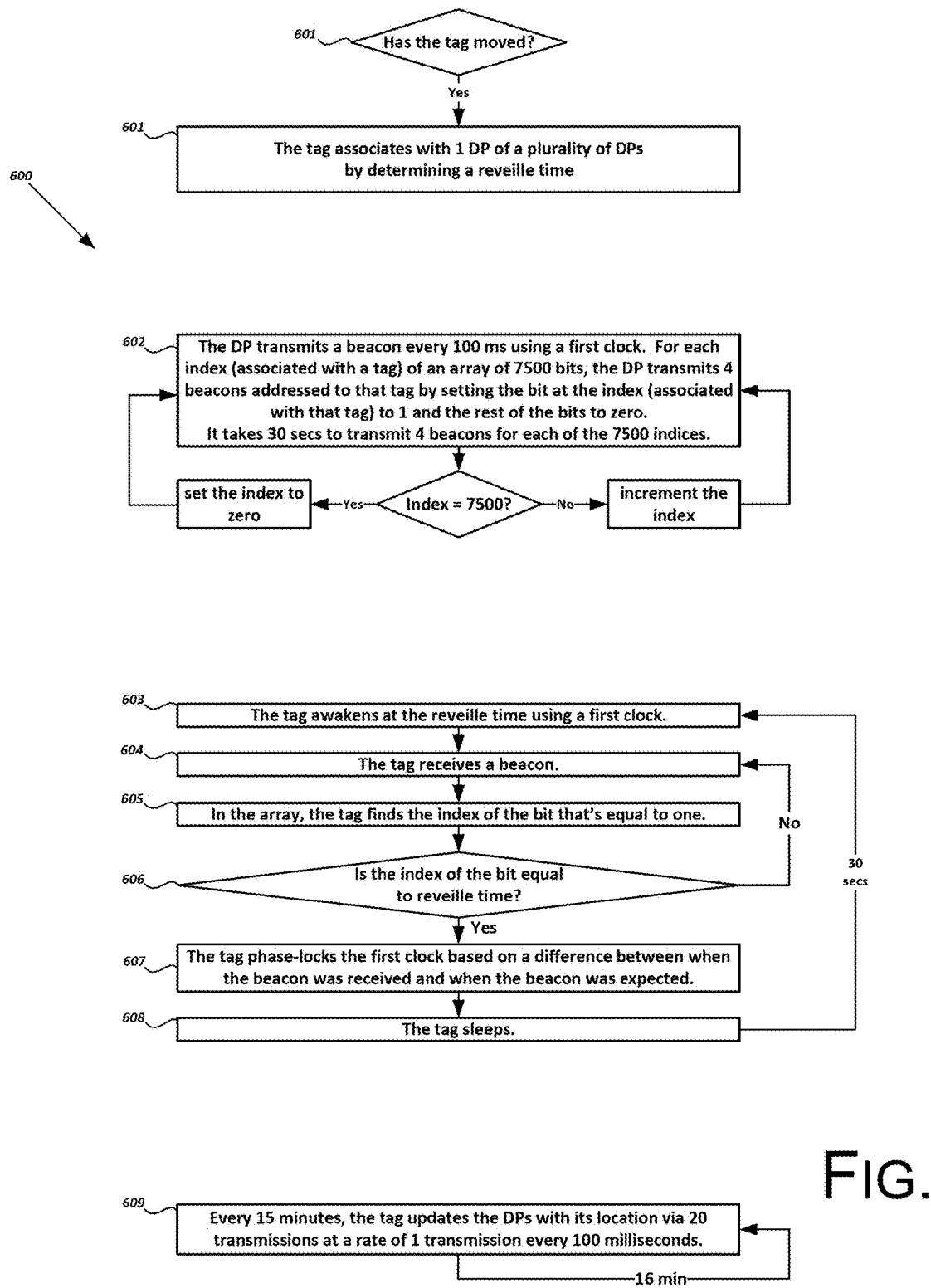

Referring to FIG. 6, a specific embodiment of the present invention features a method (600) of waking from energy-efficient hibernation to transmit an indoor localization beacon by initiating a WakeUp subroutine. The method may comprise a tag (1001) passively associating (601) with a detection point (DP) (1002) of a plurality of DPs if the tag (1001) has moved to a new location. The procedure for associating may comprise the tag (1001) determining a reveille time to transmit a beacon addressed to the DP (1002). The reveille time may be equal to at least one of a concatenation or hash of a tag ID and a DP ID, a geographic number, a location ID of a DP (1002) modified by a location ID of a tag (1001), or a combination thereof. The method may further comprise the DP (1002) transmitting (602) every 100 milliseconds a beacon 4 times for every array index of an array. The beacon may comprise an array of bits and wherein the bit located at an array index that is a combination of the tag (1001) ID and the DP (1002) ID is set to 1 and all other bits are set to 0.

The method of the specific embodiment may further comprise the tag (1001) executing a WakeUp subroutine every 30 seconds. The WakeUp subroutine may comprise the tag (1001) executing an awakening cycle (603) at the reveille time using a first clock (1004), initiating (604) a bare boot, receiving (605) at least one of the 4 beacons, and confirming that each received beacon of the at least 4 beacons is addressed to the tag (1001). The first clock (1004) may be a resistive-capacitive circuit timing element (1004). The procedure for confirmation may comprise the tag (1001) finding (606) the bit in the array that is equal to 1, and verifying (607) whether the array index of the found bit is a combination of the tag (1001) ID and the DP (1002) ID. The WakeUp subroutine may further comprise the tag (1001) phase-locking (608) the first clock (1004) based on a difference between when the beacon was received and when the beacon was expected, and returning to sleep (609). The method may further comprise the tag (1001) broadcasting (610) 20 transmissions (1201) to the plurality of DPs every 15 minutes at a rate of 1 transmission every 100 milliseconds, wherein each of the 20 transmissions (1201) comprises an updated location of the tag (901).

The method may further comprise each DP (1002) of the plurality of DPs receiving the updated location and filtering noise associated with each transmission using a Kalman filter. The procedure for receiving through the use of the Kalman filter may comprise each DP (1002) of the plurality of DPs determining an Angle of Arrival of the Kalman-filtered transmission, and applying MUltiple Signal Classification (MUSIC) to improve the accuracy of the determined Angle of Arrival. A second clock (1005), associated with the DP (1002) may be a temperature-compensated crystal oscillator (TCXO) timing element (1005).

Figure 7:
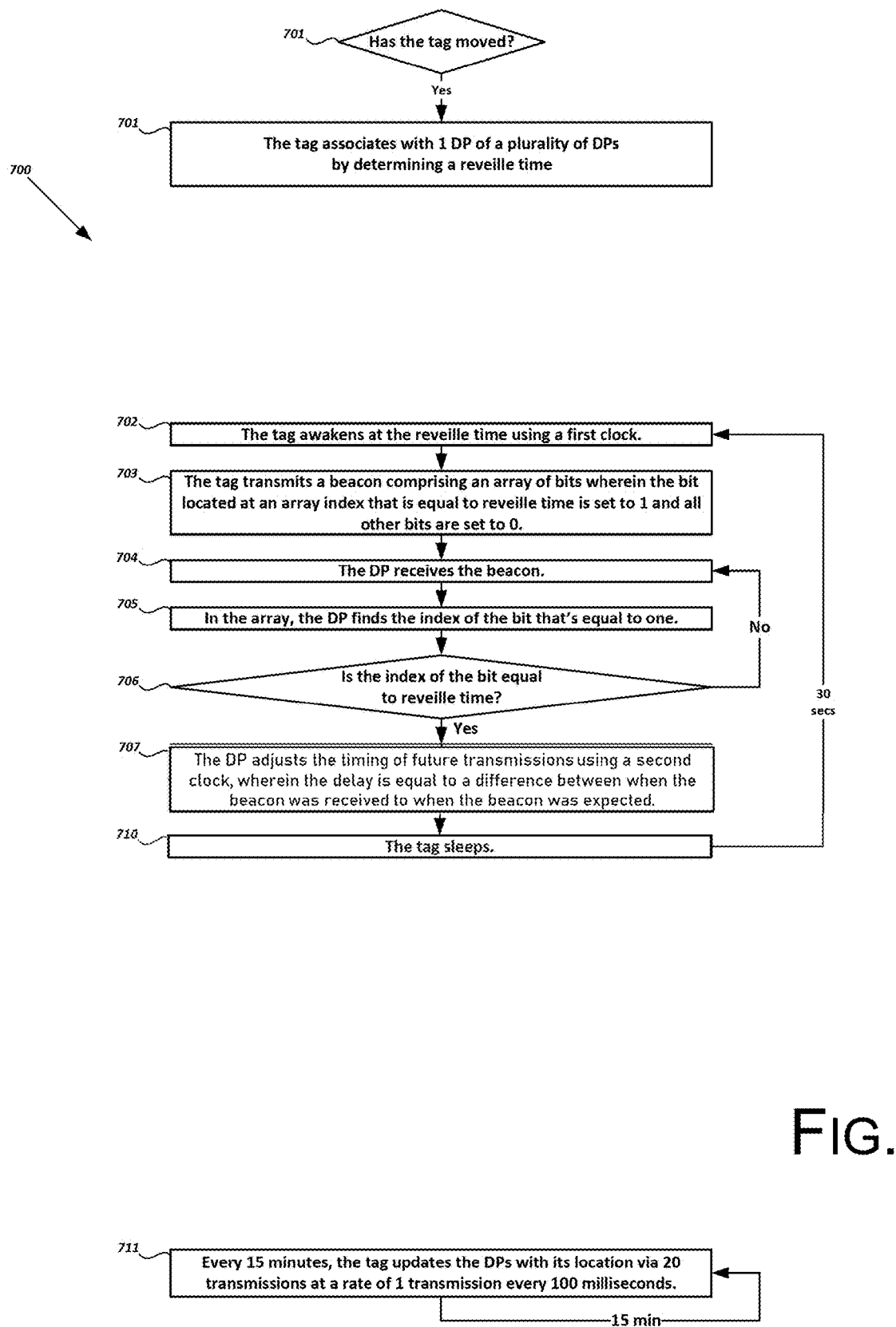

Referring to FIG. 7, a specific embodiment of the present invention features a method (700) of waking from energy-efficient hibernation to transmit an indoor localization beacon by initiating a WakeUp subroutine. The method may comprise a tag (1001) passively associating (701) with a DP (1002) of a plurality of DPs if the tag (1001) has moved to a new location. The procedure for associating may comprise the tag (1001) determining a reveille time to transmit a beacon addressed to the DP (1002). The reveille time may be equal to at least one of a concatenation or hash of a tag ID and a DP ID, a geographic number, a location ID of a DP (1002) modified by a location ID of a tag (1001), or a combination thereof. The method may further comprise the tag (1001) executing a WakeUp subroutine every 30 seconds. The WakeUp subroutine may comprise the tag (1001)

executing an awakening cycle (702) at the reveille time using a first clock (1004), and transmitting (703) the beacon. The first clock (1004) may be a resistive-capacitive circuit timing element (1004). The beacon may comprise an array of bits, wherein the bit located at an array index that is equal to reveille time is set to 1 and all other bits are set to 0. The WakeUp subroutine may further comprise the DP (1002) receiving (704) the beacon, and confirming that the beacon is addressed to the DP (1002). The procedure for confirming may comprise the DP (1002) finding (705) the bit in the array that is equal to 1, and verifying (706) whether the array index of the found bit is equal to reveille time. The WakeUp subroutine may further comprise the DP (1002) delaying (707) the time at which it will send the tag (1001) future transmissions after a delay that is equal to a difference between when the beacon was received and when the beacon was expected using a second clock (1005). The tag (1001) may then return to sleep (710). The method may further comprise the tag (1001) broadcasting (711) 20 transmissions (1201) to the plurality of DPs every 15 minutes at a rate of 1 transmission every 100 milliseconds, wherein each of the 20 transmissions (1201) comprises an updated location of the tag (1001).

The method of the specific embodiment may further comprise each DP (1002) of the plurality of DPs receiving the updated location and filtering noise associated with each transmission using a Kalman filter. The procedure for receiving through the use of the Kalman filter may comprise each DP (1002) of the plurality of DPs determining an Angle of Arrival of the Kalman-filtered transmission, and applying MUltiple Signal Classification (MUSIC) to improve the accuracy of the determined Angle of Arrival. The second clock (1005), associated with the DP (1002) may be a TCXO timing element (1005).

Figure 8:
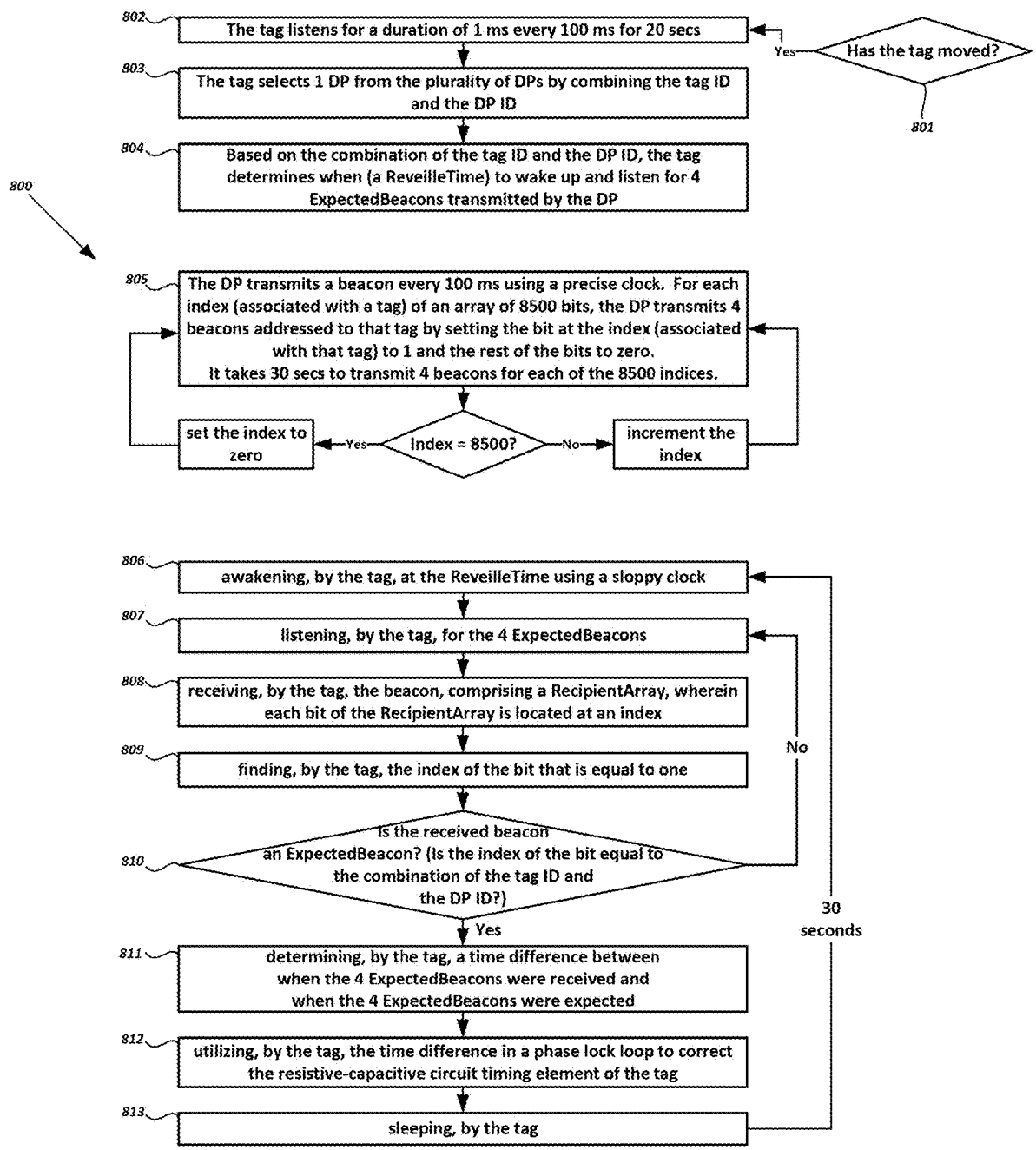
FIG. 8 is a flowchart of a tag waking from energy-efficient hibernation every 30 seconds to received beacons broadcasted from a DP. The length of the intervals of transmission, the range of the number of transmissions, and the durations of listening, transmitting, and sleeping are exemplary of the best mode of the preferred embodiment of the invention to achieve optimal energy-efficiency.
Figure 8:
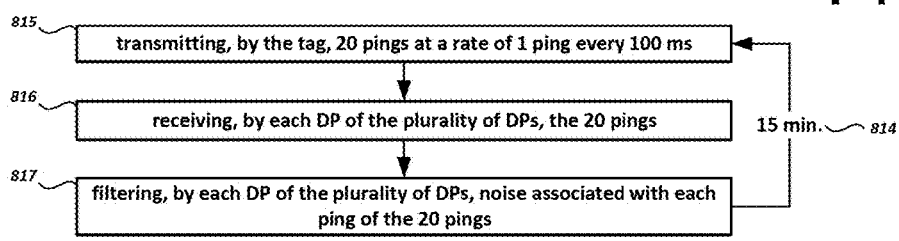

Referring to FIG. 8, a specific embodiment of the present invention features a method (800) for a plurality of detection points (DPs) to locate a radiofrequency (RF) tag (1001) of a plurality of tags, using RF indoor localization comprising a plurality of beacons. A beacon (1301) may be a RF advertising packet comprising a payload, the payload may comprise a RecipientArray and a command, and the RecipientArray may be an array of bits. The method may comprise the tag (1001) executing (801) a PassiveAssociation subroutine if the tag (1001) detects a change of a location of the tag (1001). The PassiveAssociation subroutine may comprise the tag (1001) listening (802) for a duration of 1 millisecond every 100 milliseconds for 20 seconds (301), and selecting (803) a DP (1002) of the plurality of DPs. The procedure for selecting may comprise combining the tag ID and the DP ID. The PassiveAssociation subroutine may further comprise the tag (1001) determining (804) a ReveilleTime based on the combination of the tag ID and the DP ID, wherein the ReveilleTime is when to wake up and listen for 4 ExpectedBeacons transmitted by the DP (1002). In some embodiments, the reveille time is equal to at least one of a concatenation or hash of a tag ID and a DP ID, a geographic number, a location ID of a DP (1002) modified by a location ID of a tag (1001), or a combination thereof.

The method of the specific embodiment may further comprise the DP (1002) executing a WakeUp subroutine for each index of the RecipientArray. The WakeUp subroutine may comprise the DP (1002) transmitting (805) 4 beacons at a rate of 1 beacon every 100 milliseconds using a TCXO timing element (1005). For each beacon (1301) of the 4 beacons, the bit located at the index of RecipientArray (1303) is equal to 1 and every other bit of the RecipientArray (1303) is equal to 0.

The method of the specific embodiment may further comprise the tag (1001) executing a Respond subroutine every 30 seconds. The Respond subroutine may comprise the tag (1001) executing an awakening cycle (806) at the ReveilleTime using a resistive-capacitive circuit timing element (1004), and listening (807) for the 4 ExpectedBeacons. The procedure for listening may comprise the tag (1001) receiving (808) the beacon (1301) comprising a RecipientArray (1303), wherein each bit of the RecipientArray is located at an index. Listening may further comprise the tag (1001) finding (809) an index of a bit that is equal to one, and determining (810) that the received beacon is an Expected Beacon if the index of the bit is equal to the combination of the tag ID and the DP ID. The procedure for listening may be repeated until the tag (1001) receives the 4 ExpectedBeacons. The Respond subroutine may further comprise the tag (1001) determining (811) a time difference between a time when the 4 ExpectedBeacons were received and a time when the 4 ExpectedBeacons were expected, utilizing (812) the time difference in a phase lock loop to correct the resistive-capacitive circuit timing element (1004) of the tag (1001), and returning to sleep (813).

The method of the specific embodiment may further comprise updating (814), by the tag (1001), the location of the tag (1001) every 15 minutes. The procedure for updating may comprise the tag (1001) transmitting (815) 20 transmissions (1201) at a rate of 1 transmission every 100 milliseconds, each DP (1002) of the plurality of DPs receiving (816) the 20 transmissions (1201), and filtering (817) noise associated with each transmission of the 20 transmissions (1201).

The method of the specific embodiment may further comprise each DP (1002) of the plurality of DPs receiving the updated location and filtering noise associated with each transmission using a Kalman filter. The procedure for receiving through the use of the Kalman filter may comprise each DP (1002) of the plurality of DPs determining an Angle of Arrival of the Kalman-filtered transmission, and applying MUltiple Signal Classification (MUSIC) to improve the accuracy of the determined Angle of Arrival.

Figure 9:
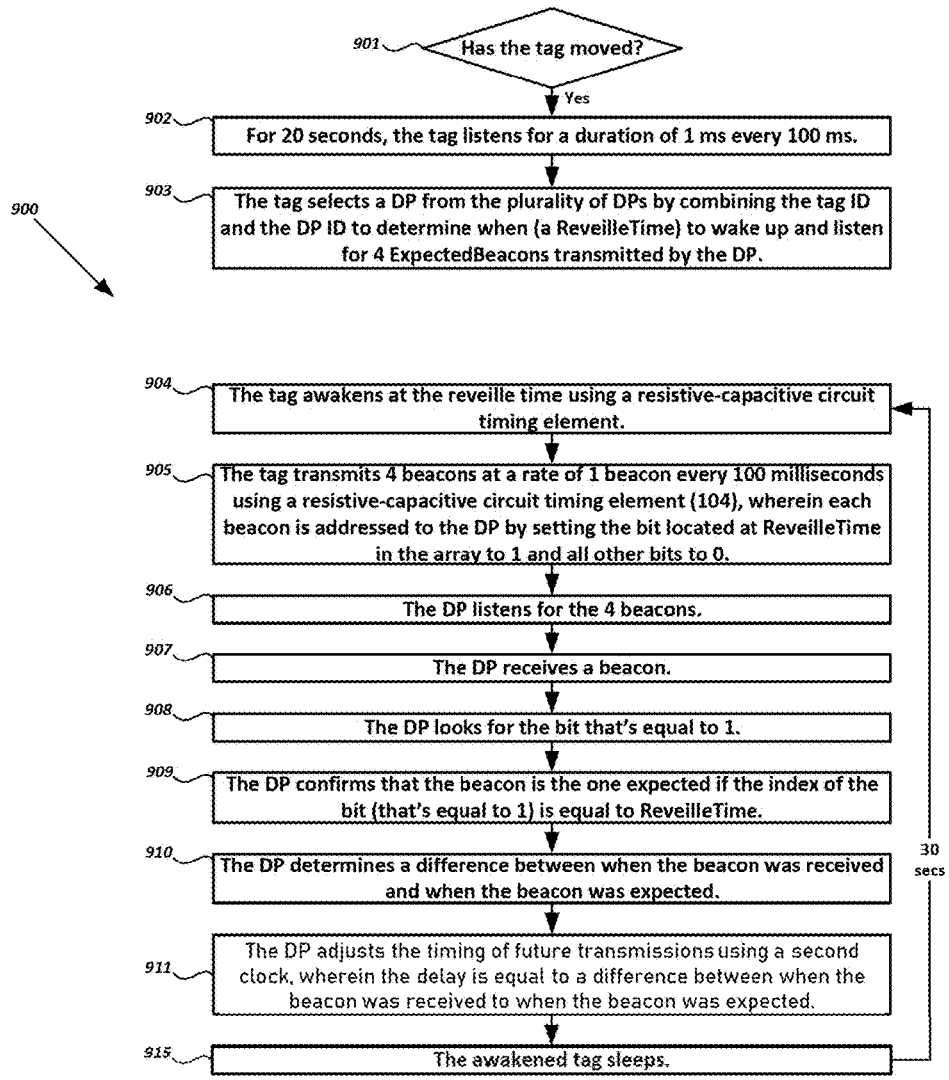
FIG. 9 is a flowchart of a tag waking from energy-efficient hibernation to transmit beacons to a DP. The length of the intervals of transmission, the range of the number of transmissions, and the durations of listening, transmitting, and sleeping are exemplary of the optimal configuration of this embodiment of the invention to achieve optimal energy-efficiency.
Figure 9:
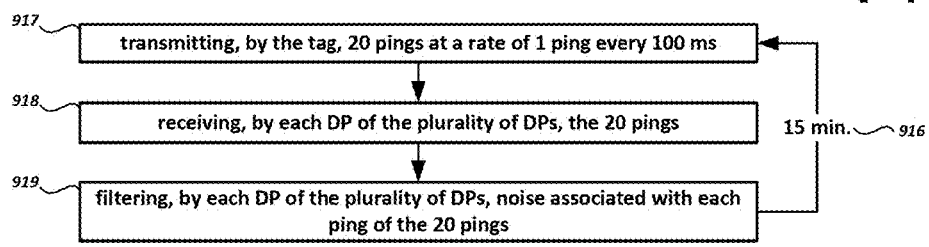

Referring to FIG. 9, a specific embodiment of the present invention features a method (900) for a plurality of DPs to locate a RF tag (1001) of a plurality of tags, using RF indoor localization comprising a plurality of beacons. A beacon (1301) may be a RF advertising packet comprising a payload (1302), the payload may comprise a RecipientArray (1303) and a command (1304), and the RecipientArray may be an array of bits. The method may comprise the tag (1001) executing (901) a PassiveAssociation subroutine if the tag (1001) detects a change of a location of the tag (1001). The PassiveAssociation subroutine may comprise the tag (1001) listening (902) for a duration of 1 millisecond every 100 milliseconds for 20 seconds (301), and selecting (903) a DP (1002) of the plurality of DPs. The procedure for selecting comprises the tag (1001) determining a ReveilleTime based on the combination of the tag ID and the DP ID, wherein the ReveilleTime is when to wake up and listen for 4 ExpectedBeacons transmitted by the DP (1002). The ReveilleTime is equal to at least one of a concatenation or hash of a tag ID and a DP ID, a geographic number, a location ID of a DP (1002) modified by a location ID of a tag (1001), or a combination thereof.

The method of the specific embodiment may further comprise the tag (1001) executing a WakeUp subroutine every 30 seconds. The WakeUp subroutine may comprise the tag (1001) executing an awakening cycle (904) at the ReveilleTime using a resistive-capacitive circuit timing element (1004), and transmitting (905) 4 beacons at a rate of 1 beacon every 100 milliseconds using a resistive-capacitive circuit timing element (1004). For each beacon of the 4 beacons, the bit located at an index of RecipientArray (1303) is equal to 1, wherein the index is equal to ReveilleTime, and every other bit of the RecipientArray (1303) is equal to 0. The WakeUp subroutine may further comprise the tag (1001) returning to sleep (915).

The method of the specific embodiment may further comprise the DP (1002) executing a Respond subroutine for each index of the RecipientArray (1303). The Respond subroutine may comprise the DP (1002) listening (906) for the 4 ExpectedBeacons. The procedure for listening may comprise the DP (1002) receiving (907) the beacon (1301), comprising a RecipientArray (1303). Each bit of the RecipientArray is located at an index. The Respond subroutine may further comprise the DP (1002) finding (908) an index of a bit that is equal to one, and determining (909) that the received beacon (1301) is an ExpectedBeacon if the index of the bit is equal to the combination of the tag ID and the DP ID. The procedure for listening may be repeated until the DP (1002) receives the 4 ExpectedBeacons. The Respond subroutine may further comprise the DP (1002) determining (910) an awakening time difference between a time when the 4 ExpectedBeacons were received and a time when the 4 ExpectedBeacons were expected, and delaying (911) the time at which future transmission will be sent to the tag (1001) using a delay equal to the awakening time difference.

The method of the specific embodiment may further comprise updating (916), by the tag (1001), the location of the tag (1001) every 15 minutes. The procedure for updating may comprise the tag (1001) transmitting (917) 20 transmissions (1201) at a rate of 1 transmission every 100 milliseconds, each DP (1002) of the plurality of DPs receiving (918) the 20 transmissions (1201), and filtering (919) noise associated with each transmission of the 20 transmissions (1201).

The method of the specific embodiment may further comprise each DP (1002) of the plurality of DPs receiving the updated location and filtering noise associated with each transmission using a Kalman filter. The procedure for receiving through the use of the Kalman filter may comprise each DP (1002) of the plurality of DPs determining an Angle of Arrival of the Kalman-filtered transmission, and applying MUltiple Signal Classification (MUSIC) to improve the accuracy of the determined Angle of Arrival.

Referring to FIG. 17, a specific embodiment of the present invention features a system for waking from energy-efficient hibernation to receive indoor localization beacons by initiating multiple subroutines. The system may comprise a plurality of beacons. A beacon (1301) is a RF advertising packet that may comprise a payload (1302). The payload may comprise a RecipientArray (1303) and a command (1304), wherein the RecipientArray is an array of bits.

The system may further comprise a RF tag (1001). The RF tag may comprise a first processor (1101) capable of executing computer-executable instructions, a first RAM component (1102), and a first memory component. The memory may comprise instructions for executing (801) a PassiveAssociation subroutine if the tag (1001) detects a change of a location of the tag (1001). The PassiveAssociation subroutine may comprise listening (802) for a duration of 1 millisecond every 100 milliseconds for 20 seconds (301), and selecting (803) a DP (1002) of the plurality of DPs. The procedure for selecting may comprise combining the tag ID and the DP ID. The PassiveAssociation subroutine may further comprise determining (804) a ReveilleTime based on the combination of the tag ID and the DP ID, wherein the ReveilleTime is when to wake up and listen for 4 ExpectedBeacons (1301) transmitted by the DP (1002). The reveille time may be equal at least one of a hash or a concatenation of a tag ID and a DP ID. The memory may further comprise instructions for executing a Respond subroutine every 30 seconds. The Respond subroutine may comprise executing an awakening cycle (806) at the ReveilleTime using a resistive-capacitive circuit timing element (804), and listening (807) for the 4 ExpectedBeacons (1301). The procedure for listening may comprise receiving (808) the beacon (1301), comprising a RecipientArray (1303), wherein each bit of the RecipientArray is located at an index. The procedure for listening may further comprise finding (809) an index of a bit that is equal to one, and determining (810), that the received beacon is an ExpectedBeacon (1301) if the index of the bit is equal to the combination of the tag ID and the DP ID. The procedure for listening may be repeated until the DP (1002) receives the 4 ExpectedBeacons. The Respond subroutine may further comprise determining (811) a time difference between a time when the 4 ExpectedBeacons (1301) were received and a time when the 4 ExpectedBeacons were expected, utilizing (812) the time difference in a phase lock loop to correct the resistive-capacitive circuit timing element (804) of the tag (1001), and returning to sleep (813). The memory may further comprise instructions for updating (814) the location of the tag (1001) every 15 minutes. The procedure for updating may comprise transmitting (815) 20 transmissions (1201) at a rate of 1 transmission every 100 milliseconds.

The system may further comprise a plurality of detection points. Each DP (1002) may comprise a second processor (1105) capable of executing computer-executable instructions, a second RAM component (1106), an antenna (1107), and a second memory component (1108). The memory may comprise instructions for executing a WakeUp subroutine for each index of the RecipientArray (1303). The WakeUp subroutine may comprise transmitting (805) 4 beacons (1301) at a rate of 1 beacon every 100 milliseconds using a TOXO timing element (1005). For each beacon of the 4 beacons, the bit located at the index of RecipientArray (1303) is equal to 1 and every other bit of the RecipientArray (1303) is equal to 0. The memory may further comprise instructions for updating (806), by the tag (1001), the location of the tag (1001) every 15 minutes. The procedure for updating may comprise each DP (1002) of the plurality of DPs receiving (816) the 20 transmissions (1201), and filtering (817) noise associated with each transmission of the 20 transmissions (1201).

In the system of the specific embodiment, each DP (1002) may receive the updated location and filtering noise associated with each transmission using a Kalman filter. The procedure for receiving through the use of the Kalman filter may comprise determining, by each DP (1002) of the plurality of DPs, an Angle of Arrival of the Kalman-filtered transmission, and applying, by each DP (1002) of the plurality of DPs, MUltiple Signal Classification (MUSIC) to improve the accuracy of the determined Angle of Arrival.

In the system of the specific embodiment, the first clock (1004), associated with the RF tag (1001), is a resistive-capacitive circuit timing element (1004) and the second clock (1005), associated with the DP (1002), is a TCXO timing element (1005).

Referring again to FIG. 17, a specific embodiment of the present invention features a system for waking from energy-efficient hibernation to transmit an indoor localization beacon by initiating multiple subroutines. The system may comprise a plurality of beacons. A beacon (1301) is a RF advertising packet that may comprise a payload (1302). The payload may comprise a RecipientArray (1303) and a command (1304), wherein the RecipientArray (1303) is an array of bits.

The system may further comprise a RF tag (1001). The RF tag may comprise a first processor (1101) capable of executing computer-executable instructions, a first RAM component (1102), and a first memory component (1104). The memory may comprise instructions for executing a PassiveAssociation subroutine if the tag (1001) detects a change of a location of the tag (1001). The PassiveAssociation subroutine may comprise listening (902) for a duration of 1 millisecond every 100 milliseconds for 20 seconds (301), and selecting (903) a DP (1002) of the plurality of DPs. The procedure for selecting may comprise combining the tag ID and the DP ID. The reveille time may be equal at least one of a hash or a concatenation of a tag ID and a DP ID. The PassiveAssociation subroutine may further comprise determining (903) a ReveilleTime based on the combination of the tag ID and the DP ID, wherein the ReveilleTime is when to wake up and listen for 4 ExpectedBeacons transmitted by the DP (1002). The memory may further comprise instructions for executing a WakeUp subroutine every 30 seconds. The WakeUp subroutine may comprise executing an awakening cycle (904) at the ReveilleTime using a resistive-capacitive circuit timing element (1004), and transmitting (905) 4 beacons at a rate of 1 beacon every 100 milliseconds using a resistive-capacitive circuit timing element (1004). For each beacon of the 4 beacons, the bit located at an index of RecipientArray is equal to 1, wherein the index is equal to ReveilleTime and every other bit of the RecipientArray is equal to 0. The WakeUp subroutine may further comprise returning to sleep (915). The memory may further comprise instructions for updating the location of the tag (1001) every 15 minutes. The procedure for updating may comprise transmitting (916) 20 transmissions (1201) at a rate of 1 transmission every 100 milliseconds.

The system of the specific embodiment may further comprise a plurality of detection points. Each DP (1002) comprises a second processor (1105) capable of executing computer-executable instructions, a second RAM component (1106), an antenna (1107), and a second memory component (1108). The memory may comprise instructions for executing a Respond subroutine for each index of the RecipientArray. The Respond subroutine may comprise the DP (1002) listening (906) for the 4 ExpectedBeacons. The procedure for listening may comprise receiving (907) the beacon (1301) comprising a RecipientArray, wherein each bit of the RecipientArray is located at an index, finding (908) an index of a bit that is equal to one, and determining (909) that the received beacon is an ExpectedBeacon if the index of the bit is equal to the combination of the tag ID and the DP ID. The procedure for listening may be repeated until the DP (1002) receives the 4 ExpectedBeacons. The Respond subroutine may further comprise determining (910) an awakening time difference between a time when the 4 ExpectedBeacons were received and a time when the 4 ExpectedBeacons were expected, and adjusting its timing to send future transmission to the tag (1001) with a delay equal to the awakening time difference. The memory may further comprise instructions for updating (916) the DP (1002) on the location of the tag (1001) every 15 minutes. The procedure for updating may comprise the tag (1001) transmitting (917) 20 transmissions (1201) at a rate of 1 transmission every 100 milliseconds, each DP (1002) of the plurality of DPs receiving (918) the 20 transmissions (1201), and filtering (919) noise associated with each transmission of the 20 transmissions (1201).

In the system of the specific embodiment, each DP (1002) of the plurality of DPs may receive the updated location and filtering noise associated with each transmission using a Kalman filter. The procedure for filtering through the use of the Kalman filter may comprise determining, by each DP (1002) of the plurality of DPs, an Angle of Arrival of the Kalman-filtered transmission, and applying, by each DP (1002) of the plurality of DPs, MUltiple Signal Classification (MUSIC) to improve the accuracy of the determined Angle of Arrival.

In the system of the specific embodiment, the first clock (1004), associated with the RF tag (1001), is a resistive-capacitive circuit timing element (1004) and the second clock (1005), associated with the DP (1002), is a TCXO timing element (1005).

The present invention features a method (100) of waking from energy-efficient hibernation to receive indoor localization beacons. In some embodiments, the method may comprise passively associating (101), by a tag (1001), with a detection point (DP) of a plurality of DPs if the tag (1001) has moved to a new location. Associating may comprise determining, by the tag (1001), a reveille time. The reveille time may be a value derived from at least one of a tag ID and a DP ID. The method may comprise transmitting (102) at a first interval, by the DP (1002), a beacon for every possible address and executing an awakening cycle (103) at a second interval, by the tag (1001), at the reveille time using a clock.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims. In some embodiments, descriptions of the inventions described herein using the phrase "comprising" includes embodiments that could be described as "consisting essentially of" or "consisting of", and as such the written description requirement for claiming one or more embodiments of the present invention using the phrase "consisting essentially of" or "consisting of" is met.

The reference numbers recited in the below claims are solely for ease of examination of this patent application, and are exemplary, and are not intended in any way to limit the scope of the claims to the particular features having the corresponding reference numbers in the drawings.

What is claimed is:

1. A method (100) of waking from energy-efficient hibernation to receive indoor localization beacons, the method comprising:
   a. passively associating (101), by a tag (1001), with a detection point (DP) of a plurality of DPs if the tag (1001) has moved to a new location, wherein associating comprises determining, by the tag (1001), a reveille time, wherein the reveille time is calculated in a cloud server, wherein the reveille time is a value derived from at least one of a tag ID and a DP ID;
   b. transmitting (102) at a first interval, by the DP (1002), a beacon for every possible address;
   c. executing an awakening cycle (103) at a second interval, by the tag (1001), at the reveille time using a clock, wherein the awakening cycle further comprises:
      i. receiving (104), by the awakened tag (1001), the transmitted beacons,
      ii. confirming (105), by the awakened tag (1001), the address.

2. The method of claim 1, further comprising receiving, by each DP (1002) of the plurality of DPs, the updated location and filtering, by each DP (1002) of the plurality of DPs, noise associated with each transmission using a Kalman filter.

3. The method of claim 2 further comprising:
a. determining, by each DP (1002) of the plurality of DPs, an Angle of Arrival of the Kalman-filtered transmission; and
b. applying, by each DP (1002) of the plurality of DPs, MUltiple SIgnal Classification (MUSIC) to improve the accuracy of the determined Angle of Arrival.

4. The method of claim 1, wherein the clock is a resistive-capacitive circuit timing element (1004).

5. The method of claim 1, wherein the tag (1001) awakens from sleep by initiating a bare boot, wherein the bare boot comprises booting from a hibernation state directly to an awakened state.

6. The method of claim 5, wherein the bare boot comprises booting from hibernation without performing a system check, without reading all memory locations to ensure that memory has not been corrupted, and without checking the IO of peripherals.

7. The method of claim 1, wherein the two-way authentication comprises comparing a first challenge encrypted by the tag (1001) and a second challenge encrypted by the DP (1002), wherein the first challenge is a prime integer equal to the second challenge.

8. The method of claim 1, wherein the awakening cycle (103) further comprises:
a. determining (106), by the awakened tag (1001), a time difference between when the beacon was received and when the beacon was expected, and
b. phase-locking (107), by the awakened tag (1001), the clock based on the time difference.

9. The method of claim 1, wherein the value derived from the at least one of a tag ID and a DP ID comprises a concatenation or hash of a tag ID and a DP ID, a location ID of a DP (1002) modified by a location ID of a tag (1001), or a combination thereof.

10. A method (200) of waking from energy-efficient hibernation to transmit an indoor localization beacon, wherein the method comprises:
a. passively associating (201), by a tag (1001), with a DP of a plurality of DPs if the tag (1001) has moved to a new location, wherein associating comprises determining, by the tag (1001), a reveille time, wherein the reveille time is calculated in a cloud server, wherein the reveille time is a value derived from at least one of a tag ID and a DP ID;
b. executing an awakening cycle (202) at a second interval, by the tag (1001), at the reveille time using a first clock (1004), wherein the awakening cycle (202) further comprises:
  i. transmitting (203) at a first interval, by the awakened tag (1001), a beacon,
  ii. receiving (204), by the DP (1002), the beacon,
  iii. confirming (205), by the DP (1002), the address.

11. The method of claim 10, further comprising receiving, by each DP (1002) of the plurality of DPs, the updated location and filtering, by each DP (1002) of the plurality of DPs, noise associated with each transmission using a Kalman filter.

12. The method of claim 11 further comprising:
a. determining, by each DP (1002) of the plurality of DPs, an Angle of Arrival of the Kalman-filtered transmission; and
b. applying, by each DP (1002) of the plurality of DPs, MUltiple SIgnal Classification (MUSIC) to improve the accuracy of the determined Angle of Arrival.

13. The method of claim 10, wherein the first clock (1004) is a resistive-capacitive circuit timing element (1004) and the second clock (1005) is a temperature-compensated crystal oscillator (TCXO) timing element (1005).

14. The method of claim 10, wherein the tag (1001) awakens from sleep by initiating a bare boot, wherein the bare boot comprises booting from a hibernation state directly to an awakened state.

15. The method of claim 14, wherein the bare boot comprises booting from booting from hibernation without performing a system check, without reading all memory locations to ensure that memory has not been corrupted, and without checking the IO of peripherals.

16. The method of claim 10, wherein the awakening cycle (202) further comprises:
a. updating (210), by the DP (1002), the location of the tag (1001),
b. delaying (206), by the DP (1002), the timing of future transmission to the tag (1001) using a second clock (1005), wherein the delay is equal to a difference between when the beacon was received to when the beacon was expected.

17. The method of claim 10, wherein the two-way authentication comprises comparing a first challenge encrypted by the tag (1001) and a second challenge encrypted by the DP (1002), wherein the first challenge is a prime integer equal to the second challenge.

18. The method of claim 10, wherein the value derived from the at least one of a tag ID and a DP ID comprises a concatenation or hash of a tag ID and a DP ID, a location ID of a DP (1002) modified by a location ID of a tag (1001), or a combination thereof.

19. A method (100) of waking from energy-efficient hibernation to receive indoor localization beacons, the method comprising:
a. passively associating (101), by a tag (1001), with a detection point (DP) of a plurality of DPs if the tag (1001) has moved to a new location, wherein associating comprises determining, by the tag (1001), a reveille time, wherein the reveille time is a value derived from at least one of a tag ID and a DP ID;
b. transmitting (102) at a first interval, by the DP (1002), a beacon for every possible address;
c. executing an awakening cycle (103) at a second interval, by the tag (1001), at the reveille time using a clock; and
d. receiving (104), by the awakened tag (1001), the transmitted beacons.

* * * * *